United States Patent
Morikawa

(10) Patent No.: US 9,571,696 B2
(45) Date of Patent: Feb. 14, 2017

(54) PRINT DATA GENERATING APPARATUS AND GENERATING METHOD FOR GENERATING COLOR CONVERSION PROFILE

(71) Applicant: BROTHER KOGYO KABUSHIKI KAISHA, Nagoya, Aichi (JP)

(72) Inventor: Shota Morikawa, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/955,576

(22) Filed: Dec. 1, 2015

(65) Prior Publication Data

US 2016/0191745 A1 Jun. 30, 2016

(30) Foreign Application Priority Data

Dec. 26, 2014 (JP) ................... 2014-264993

(51) Int. Cl.
- G03F 3/08 (2006.01)
- H04N 1/407 (2006.01)
- H04N 1/50 (2006.01)
- H04N 1/60 (2006.01)

(52) U.S. Cl.
CPC .............. H04N 1/407 (2013.01); H04N 1/502 (2013.01)

(58) Field of Classification Search
None
See application file for complete search history.

(56) References Cited

U.S. PATENT DOCUMENTS

| 2002/0021458 A1 | 2/2002 | Saito et al. | |
| 2004/0174403 A1 | 9/2004 | Yoshida et al. | |
| 2005/0094871 A1* | 5/2005 | Berns | H04N 1/6033 382/162 |
| 2012/0268752 A1* | 10/2012 | Komamiya | B41J 19/147 358/1.2 |
| 2012/0313990 A1* | 12/2012 | Sakai | B41J 2/2114 347/12 |

FOREIGN PATENT DOCUMENTS

| JP | 2001-171151 A | 6/2001 |
| JP | 2002-033930 A | 1/2002 |
| JP | 2004-106191 A | 4/2004 |
| JP | 2009-113326 A | 5/2009 |

* cited by examiner

*Primary Examiner* — Dov Popovici

(74) *Attorney, Agent, or Firm* — Scully, Scott, Murphy & Presser, PC

(57) ABSTRACT

A print data generating apparatus executes color conversion on image data using a color conversion profile to generate print data. In the color conversion profile, each of a plurality of sets of specific color data defined in a specific color space are associated with a set of first ink color data defined in an ink color space. A part of the plurality of sets of specific color data are further associated with a set of second ink color data defined in the ink color space. In bi-directional printing, a print executing unit uses the first ink color data to execute one of forward print and backward print, and uses both the first ink color data and the second ink color data to execute another of forward print and backward print.

17 Claims, 11 Drawing Sheets

FIG. 4A

PFD

LT {

| No. | RGB VALUES | | | CMYK VALUES | | | | REF. RI |
|---|---|---|---|---|---|---|---|---|
| | R | G | B | C | M | Y | K | |
| 1 | 0 | 0 | 0 | c1 | m1 | y1 | k1 | |
| 2 | 0 | 0 | 16 | c2 | m2 | y2 | k2 | |
| 3 | 0 | 0 | 32 | c3 | m3 | y3 | k3 | |
| 4 | 0 | 0 | 48 | c4 | m4 | y4 | k4 | |
| 290 | 16 | 16 | 0 | c290 | m290 | y290 | k290 | |
| 291 | 16 | 16 | 16 | c291 | m291 | y291 | k291 | |
| 292 | 16 | 16 | 32 | c292 | m292 | y292 | k292 | 294 |
| 293 | 16 | 16 | 48 | c293 | m293 | y293 | k293 | |
| 294 | 16 | 16 | 64 | c294 | m294 | y294 | k294 | |
| 295 | 16 | 16 | 80 | c295 | m295 | y295 | k295 | 296 |
| 296 | 16 | 16 | 96 | c296 | m296 | y296 | k296 | 278 |
| 297 | 16 | 16 | 112 | c297 | m297 | y297 | k297 | |
| 298 | 16 | 16 | 128 | c298 | m298 | y298 | k298 | 314 |
| 299 | 16 | 16 | 144 | c299 | m299 | y299 | k299 | 300 |
| 4910 | 255 | 255 | 208 | c4910 | m4910 | y4910 | k4910 | |
| 4911 | 255 | 255 | 224 | c4911 | m4911 | y4911 | k4911 | |
| 4912 | 255 | 255 | 240 | c4912 | m4912 | y4912 | k4912 | |
| 4913 | 255 | 255 | 255 | c4913 | m4913 | y4913 | k4913 | |

| No. | Lab VALUES | | |
|---|---|---|---|
| | L* | a* | b* |
| 1 | L1 | a1 | b1 |
| 2 | L2 | a2 | b2 |
| 3 | L3 | a3 | b3 |
| 4 | L4 | a4 | b4 |
| 290 | L290 | a290 | b290 |
| 291 | L291 | a291 | b291 |
| 292 | L292 | a292 | b292 |
| 293 | L293 | a293 | b293 |
| 294 | L294 | a294 | b294 |
| 295 | L295 | a295 | b295 |
| 296 | L296 | a296 | b296 |
| 297 | L297 | a297 | b297 |
| 298 | L298 | a298 | b298 |
| 299 | L299 | a299 | b299 |
| 4910 | L4910 | a4910 | b4910 |
| 4911 | L4911 | a4911 | b4911 |
| 4912 | L4912 | a4912 | b4912 |
| 4913 | L4913 | a4913 | b4913 |

FIG. 8

PFD2

PT1

| No. | RGB VALUES | | | R' G' B' VALUES | | |
|---|---|---|---|---|---|---|
|  | R | G | B | R' | G' | B' |
| 1 | 16 | 16 | 31 | 16 | 16 | 62 |
| 2 | 16 | 16 | 32 | 16 | 15 | 64 |
| 3 | 16 | 17 | 33 | 16 | 16 | 64 |
| 4 | 16 | 17 | 34 | 16 | 16 | 65 |
| 30 | 225 | 10 | 210 | 225 | 11 | 201 |
| 31 | 225 | 10 | 211 | 225 | 11 | 203 |
| 32 | 225 | 12 | 210 | 225 | 13 | 200 |
| 33 | 225 | 12 | 211 | 225 | 12 | 202 |
| 34 | 225 | 12 | 212 | 225 | 13 | 204 |

PT2

| No. | RGB VALUES | | | CMYK VALUES | | | |
|---|---|---|---|---|---|---|---|
|  | R | G | B | C | M | Y | K |
| 1 | 0 | 0 | 0 | c1 | m1 | y1 | k1 |
| 2 | 0 | 0 | 16 | c2 | m2 | y2 | k2 |
| 3 | 0 | 0 | 32 | c3 | m3 | y3 | k3 |
| 4 | 0 | 0 | 48 | c4 | m4 | y4 | k4 |
| 290 | 16 | 16 | 0 | c290 | m290 | y290 | k290 |
| 291 | 16 | 16 | 16 | c291 | m291 | y291 | k291 |
| 292 | 16 | 16 | 32 | c292 | m292 | y292 | k292 |
| 293 | 16 | 16 | 48 | c293 | m293 | y293 | k293 |
| 294 | 16 | 16 | 64 | c294 | m294 | y294 | k294 |
| 295 | 16 | 16 | 80 | c295 | m295 | y295 | k295 |
| 296 | 16 | 16 | 96 | c296 | m296 | y296 | k296 |
| 297 | 16 | 16 | 112 | c297 | m297 | y297 | k297 |
| 298 | 16 | 16 | 128 | c298 | m298 | y298 | k298 |
| 299 | 16 | 16 | 144 | c299 | m299 | y299 | k299 |
| 4910 | 255 | 255 | 208 | c4910 | m4910 | y4910 | k4910 |
| 4911 | 255 | 255 | 224 | c4911 | m4911 | y4911 | k4911 |
| 4912 | 255 | 255 | 240 | c4912 | m4912 | y4912 | k4912 |
| 4913 | 255 | 255 | 255 | c4913 | m4913 | y4913 | k4913 |

PRINT DATA GENERATING APPARATUS AND GENERATING METHOD FOR GENERATING COLOR CONVERSION PROFILE

CROSS REFERENCE TO RELATED APPLICATION

This application claims priority from Japanese Patent Application No. 2014-264993 filed Dec. 26, 2014. The entire content of the priority application is incorporated herein by reference.

TECHNICAL FIELD

The present disclosure relates to a print data generating apparatus and a method for generating print data based on target image data, especially, for generating print data for a print executing apparatus performing bi-directional printing.

BACKGROUND

A printer that executes bi-directional printing by combining forward printing with backward printing is known in the art. The print head in this type of printer has a plurality of nozzle groups for ejecting ink in a plurality of colors used for printing, such as cyan, magenta, yellow, and black. These groups of nozzles are arranged in a prescribed color order along the main scanning direction. As a consequence, when the printer performs bi-directional printing, the order of dots formed in different colors differs between forward printing and backward printing. Thus, in bi-directional printing, color tones produced in a partial image printed by forward printing (hereinafter called a "forward image") may differ from a partial image printed by backward printing (hereinafter called a "backward image").

A method described in US Patent Application Publication No. 2004/0174403 performs different gamma correction for forward images and backward images in order to suppress such differences in color tones produced between forward images and backward images.

SUMMARY

However, these differences in color tones between forward images and backward images are not simple in that they do not change linearly in response to changes in component values, for example. Accordingly, the use of different gamma correction in the conventional method described above may not be able to suppress differences in color tones between forward images and backward images sufficiently.

In view of the foregoing, it is an object of the disclosure to provide a new method of suppressing differences in color tones between forward images printed by forward printing and backward images printed by backward printing.

In order to attain the above and other objects, the disclosure provides a print data generating apparatus. The print data generating apparatus includes a print executing unit, a storage unit, and a controller. The print executing unit includes a print head having a plurality of nozzles for ejecting a plurality of colors of ink droplets respectively. The plurality of nozzles is arranged in a main scanning direction. The print executing apparatus is configured to perform bi-directional printing. The bi-directional printing includes: forward print in which the print head forms dots by ejecting ink droplets while moving forward in the main scanning direction; and backward print in which the print head forms dots by ejecting ink droplets while moving backward in the main scanning direction. The storage unit stores a color conversion profile defining correlations between a plurality of sets of specific color data and a plurality of sets of ink color data. Each set of specific color data has a combination of color component values that are defined in a specific color space. The plurality of sets of specific color data include at least one set of prescribed color data. Each of the at least one set of prescribed color data has a prescribed combination of color component values that are defined in the specific color space. Each set of ink color data has a combination of color component values that are defined in an ink color space. Each of the color component values that are defined in the ink color space corresponds to one of the plurality of colors of ink droplets. The plurality of sets of ink color data includes a plurality of sets of first ink color data and at least one set of second ink color data. Each of the plurality of sets of the first ink color data has a first combination of color component values that are defined in the ink color space. Each of the at least one set of the second ink color data has a second combination of color component values that are defined in the ink color space. Each of the plurality of sets of specific color data is associated with a set of first ink color data. Each of the at least one set of prescribed color data is associated with a set of first ink color data and a set of second ink color data. The controller is configured to: acquire target image data representing an image including a plurality of pixels each having a color, the target image data representing the color of each of the plurality of pixels by a combination of color component values defined in the specific color space; execute a color conversion on the target image data using the color conversion profile to generate converted image data, the converted image data including a plurality of converted pixels each having a color, the converted image data representing the color of each of the plurality of converted pixels by a combination of color component values defined in the ink color space, and generate the print data based on the converted image data. The controller executes the color conversion on the target image data by: acquiring partial image data from the target image data; executing, when the partial image data is first partial image data, a color conversion on the partial image data by using correlations between the plurality of sets of specific color data and the plurality of sets of first ink color data based on the color conversion profile, the first partial image data representing a first partial image, the first partial image being a portion of the image to be printed by performing one of the forward print and the backward print, the partial image data being either one of the first partial image data and second partial image data, the second partial image data representing a second partial image, the second partial image being a portion of the image to be printed by performing another of the forward print and the backward print; and executing, when the partial image data is the second partial image data, a color conversion on the partial image data by: executing, when the partial image data is the second partial image data, a color conversion on the partial image data by: converting pixel data representing a pixel included in the second partial image by using a correlation between the at least one set of prescribed color data and the at least one set of second ink color data based on the color conversion profile, when the pixel data has a combination of color component values defined in the specific color space corresponding to the prescribed combination of color component values of the at least one set of prescribed color data.

According to another embodiment, the disclosure provides a color conversion profile generating method for generating a color conversion profile that is used when a print executing apparatus generates print data. The print executing apparatus includes a print head. The print head has a plurality of nozzles for ejecting a plurality of colors of ink droplets respectively. The plurality of nozzles is arranged in a main scanning direction. The print executing apparatus is configured to perform bi-directional printing. The bi-directional printing includes: forward print in which the print head forms dots by ejecting ink droplets while moving forward in the main scanning direction; and backward print in which the print head forms dots by ejecting ink droplets while moving backward in the main scanning direction. The color conversion profile generating method includes: preparing a first profile for one of the forward print and the backward print, the first profile defining correlations between a plurality of sets of specific color data and a plurality of sets of first ink color data, each set of specific color data having a combination of color component values that are defined in a specific color space, the plurality of sets of specific color data including at least one set of prescribed color data, each of the at least one set of prescribed color data having a prescribed combination of color component values that are defined in the specific color space, each set of first ink color data having a combination of color component values that are defined in an ink color space, each of the color component values that are defined in the ink color space corresponding to one of the plurality of colors of ink droplets; printing a plurality of first images based on the plurality of sets of first ink color data by executing one of the forward print and the backward print; printing a plurality of second images based on the plurality of sets of first ink color data by executing another of the forward print and the backward print; measuring a color of each of the plurality of first images and the plurality of second images, the plurality of first images and the plurality of second images being associated with one-to-one correspondence; determining at least one set of prescribed color data from the plurality of sets of specific color data by calculating a first color difference between each of the plurality of first images and corresponding one of the plurality of second images, and determining, as one set of prescribed color data, one of the plurality of sets of specific color data whose first color difference is greater than a predetermined threshold; determining corresponding one set of second ink color data associated with each of the at least one set of prescribed color data, each set of second ink color data having a second color difference smaller than the first color difference, the second color difference being a difference between: an image based on the each set of second ink color data by executing the another of the forward print and the backward print; and another image based on one set of first ink color data associated with one set of prescribed color data associated with the each set of second ink color data by executing the one of the forward print and the backward print; and generating a color conversion profile including the first profile and a second profile, the second profile defining a correlation between each of the at least one set of prescribed color data and the corresponding one set of second ink color data.

According to another embodiment, the disclosure provides a non-transitory computer readable storage medium storing a set of program instructions executable by a computer. The computer is configured to generate print data used in a print executing apparatus. The print executing apparatus includes a print head. The print head has a plurality of nozzles for ejecting a plurality of colors of ink droplets respectively. The plurality of nozzles is arranged in a main scanning direction. The print executing apparatus is configured to perform bi-directional printing. The bi-directional printing includes: forward print in which the print head forms dots by ejecting ink droplets while moving forward in the main scanning direction; and backward print in which the print head forms dots by ejecting ink droplets while moving backward in the main scanning direction. The computer includes a storage unit storing a color conversion profile defining correlations between a plurality of sets of specific color data and a plurality of sets of ink color data. Each set of specific color data has a combination of color component values that are defined in a specific color space. The plurality of sets of specific color data includes at least one set of prescribed color data. Each of the at least one set of prescribed color data has a prescribed combination of color component values that are defined in the specific color space. Each set of ink color data has a combination of color component values that are defined in an ink color space. Each of the color component values that are defined in the ink color space corresponds to one of the plurality of colors of ink droplets. The plurality of sets of ink color data includes a plurality of sets of first ink color data and at least one set of second ink color data. Each of the plurality of sets of the first ink color data has a first combination of color component values that are defined in the ink color space. Each of the at least one set of the second ink color data has a second combination of color component values that are defined in the ink color space. Each of the plurality of sets of specific color data is associated with a set of first ink color data. Each of the at least one set of prescribed color data is associated with a set of first ink color data and a set of second ink color data. The program instructions includes: acquiring target image data representing an image including a plurality of pixels each having a color, the target image data representing the color of each of the plurality of pixels by a combination of color component values defined in the specific color space; executing a color conversion on the target image data using the color conversion profile to generate converted image data, the converted image data including a plurality of converted pixels each having a color, the converted image data representing the color of each of the plurality of converted pixels by a combination of color component values defined in the ink color space; and generating the print data based on the converted image data. The controller executes the color conversion on the target image data by: acquiring partial image data from the target image data; executing, when the partial image data is first partial image data, a color conversion on the partial image data by using correlations between the plurality of sets of specific color data and the plurality of sets of first ink color data based on the color conversion profile, the first partial image data representing a first partial image, the first partial image being a portion of the image to be printed by performing one of the forward print and the backward print, the partial image data being either one of the first partial image data and second partial image data, the second partial image data representing a second partial image, the second partial image being a portion of the image to be printed by performing another of the forward print and the backward print; and executing, when the partial image data is the second partial image data, a color conversion on the partial image data by: converting pixel data representing a pixel included in the second partial image by using a correlation between the at least one set of prescribed color data and the at least one set of second ink color data based on the color conversion profile, when the pixel data has a combination of color component values defined in the specific color space corresponding to the prescribed combination of color component values of the at least one set of prescribed color data; and converting pixel data representing a pixel included in the second partial image by using correlations between the plurality of sets of specific color data and the plurality of sets of first ink color data based on the color conversion profile, when the pixel data has a combination of color component values defined in the specific color space that does not correspond to the prescribed combination of color component values of the at least one set of prescribed color data.

BRIEF DESCRIPTION OF THE DRAWINGS

The particular features and advantages of the disclosure as well as other objects will become apparent from the following description taken in connection with the accompanying drawings, in which:

FIG. 4A shows an example of a color conversion profile according to the first embodiment;

FIG. 4B shows an example of colorimetric data according to the first embodiment;

FIG. 8 shows an example of a color conversion profile according to a second embodiment;

DETAILED DESCRIPTION

A. First Embodiment

A-1. Configuration of a Printing System

Figure 1:
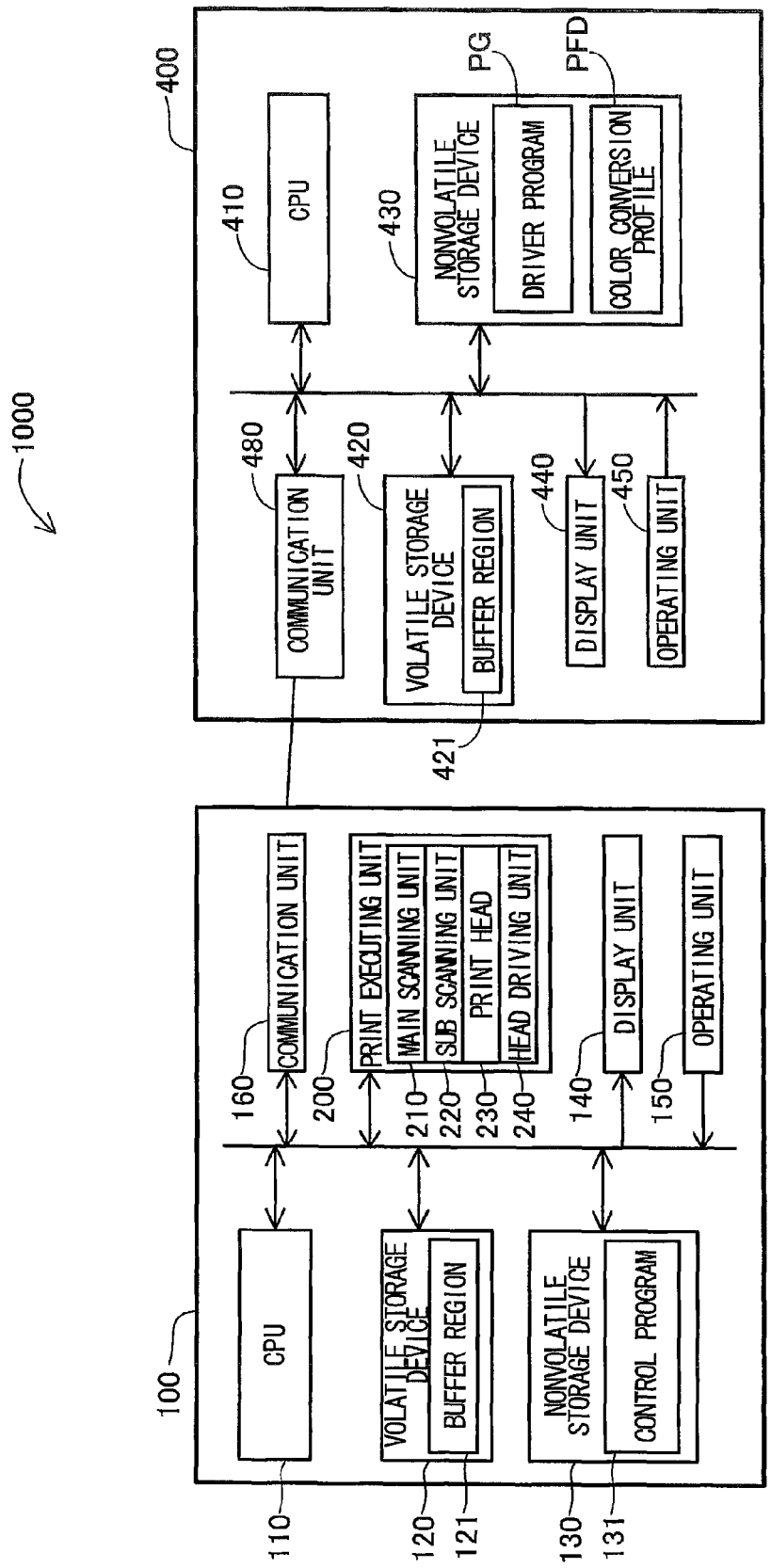
FIG. 1 is a block diagram showing a printing system including a print executing device and a print data generating apparatus according to a first embodiment.

Next, a first embodiment will be described while referring to FIGS. 1-7. FIG. 1 is a block diagram showing the configuration of a printing system 1000 according to the first embodiment. As shown in FIG. 1, the printing system 1000 includes a personal computer 400, and a printer 100 serving as an example of a print executing apparatus.

The printer 100 includes a CPU 110 as the controller that controls the printer 100; a volatile storage device 120, such as DRAM; a nonvolatile storage device 130, such as flash memory; a display unit 140, such as a liquid crystal display; an operating unit 150 that includes a touchscreen, buttons, and the like; a communication unit 160; and a print executing unit 200. The communication unit 160 includes an interface for connecting to an external device, such as the personal computer 400, and is used for performing data communications with the external device.

The volatile storage device 120 includes a buffer region 121 for temporarily storing various intermediate data used by the CPU 110 when the CPU 110 executes programs (a control program 131 described later, for example).

The control program 131 is stored in the nonvolatile storage device 130. By executing the control program 131, the CPU 110 can implement various functions for controlling the printer 100, such as a function for controlling the print executing unit 200 to execute a printing operation. The control program 131 is stored in the nonvolatile storage device 130 prior to shipping the printer 100, for example. Alternatively, the control program 131 may be recorded on a DVD-ROM or the like, or may be made available for download from a server over a network.

The print executing unit 200 is an inkjet-type printing mechanism that prints images by ejecting ink droplets in the colors cyan, magenta, yellow, and black (hereinafter abbreviated as C, M, Y, and K). The print executing unit 200 performs printing by ejecting ink droplets in the colors C, M, Y, and K to form dots on paper. The print executing unit 200 includes a main scanning unit 210, a sub scanning unit 220, a print head 230, and a head driving unit 240.

Figure 2A:
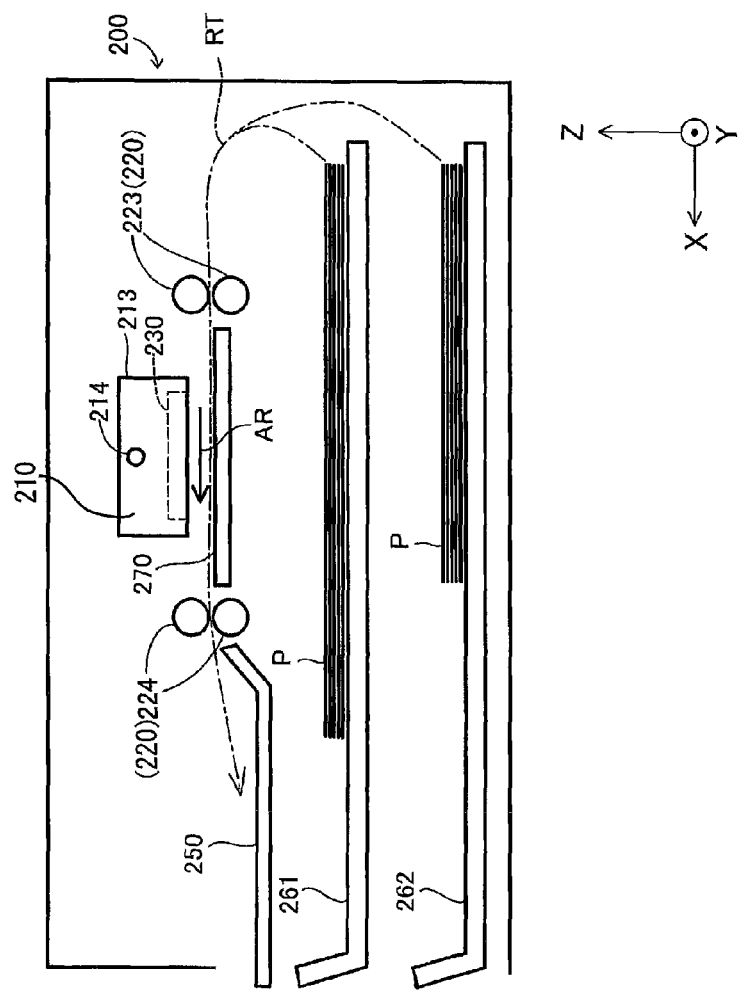
FIG. 2A is an outline of overall structure of the print executing apparatus.

FIG. 2A provides an outline of the overall structure of the print executing unit 200. As shown in FIG. 2A, the print executing unit 200 further includes paper trays 261 and 262 for accommodating sheets P of paper (A4-size paper, for example) as the printing medium; a discharge tray 250 for receiving sheets P discharged after being printed; and a platen 270 disposed in a position for confronting the surface of the print head 230 from which ink is ejected.

The main scanning unit 210 includes a carriage 213 that supports the print head 230, a sliding shaft 214 that retains the carriage 213 while enabling the carriage 213 to move along the main scanning direction (the direction of the Y-axis in FIG. 2A); and a main scanning motor (not shown). The main scanning unit 210 uses the drive force outputted from the main scanning motor to reciprocate the carriage 213 along the sliding shaft 214. This operation implements a main scan for reciprocating the carriage 213 along the main scanning direction relative to a sheet P. A main scan includes a forward pass and a backward pass. The forward pass and backward pass are each a main scan in one of the two main scanning directions, i.e., the two opposing directions parallel to the Y-axis in FIGS. 2A and 2B. Specifically, the forward pass is a main scan in the negative direction (−Y direction), while the backward pass is a main scan in the positive direction (+Y direction). In the following description, the −Y direction will be called the forward direction and the +Y direction the backward direction.

The sub scanning unit 220 is provided with a plurality of conveying rollers and a sub scanning motor (not shown). The conveying rollers include a pair of upstream rollers 223 disposed on the upstream side of the platen 270, and a pair of downstream rollers 224 disposed on the downstream side of the platen 270. The sub scanning unit 220 uses the drive force outputted from the sub scanning motor to convey sheets P from the paper trays 261 and 262 along a conveying path RT passing over the platen 270 and leading to the discharge tray 250. This operation implements a sub scan for moving the printing medium relative to the print head 230 in a sub scanning direction crossing the main scanning direction. The arrow AR in FIG. 2A denotes the sub scanning direction described above, that is, the direction in which the sheets P are conveyed over the platen 270 (the +X direction in FIG. 2A).

Figure 2B:
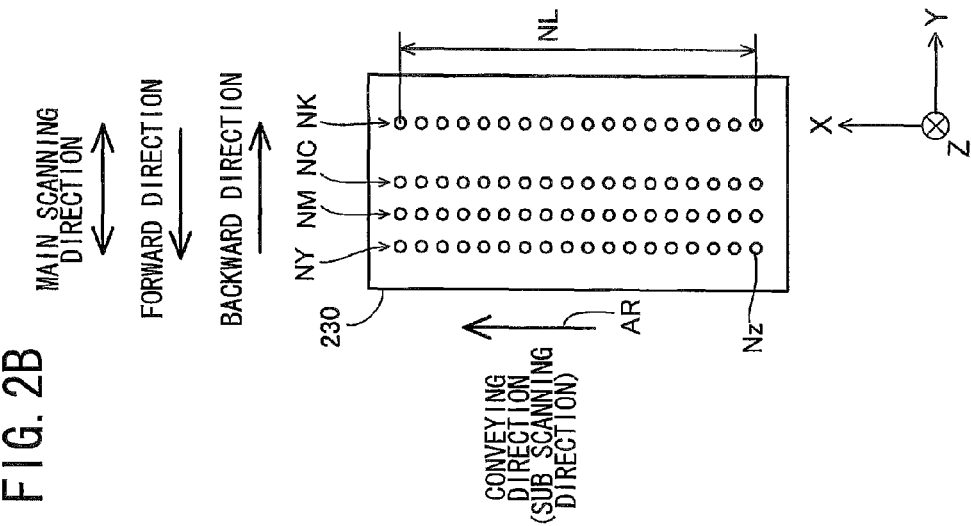
FIG. 2B is a bottom view of a print head in the print executing apparatus.

FIG. 2B is a bottom view of the print head 230, i.e., a view of the print head 230 from the −Z side. The print head 230 has a plurality of nozzles Nz for ejecting ink in a plurality of colors. Specifically, nozzle rows NC, NM, NY, and NK are formed in the surface of the print head 230 that confronts the platen 270 (the −Z side surface of the print head 230) for ejecting ink in the colors C, M, Y, and K, respectively. Each of the nozzle rows includes a plurality of nozzles Nz aligned in the sub scanning direction. The length of the nozzle rows in the sub scanning direction will be called a nozzle length NL. The nozzle rows NC, NM, NY, and NK for respectively ejecting C, M, Y, and K ink droplets are arranged relative to each other in a prescribed order in the main scanning direction. In the first embodiment, the nozzle rows are ordered by the colors K, C, M, and Y from the upstream side in the forward direction (the +Y side) toward the downstream side (the −Y side), as shown in FIG. 2B.

The head driving unit 240 drives the print head 230 on the basis of print data while the main scanning unit 210 performs a main scan. Through the driving action of the head driving unit 240, the print head 230 ejects ink onto the printing medium moved by the sub scanning unit 220. These operations implement a printing process in which dots are formed on the printing medium.

As shown in FIG. 1, the personal computer 400 includes a CPU 410 serving as an example of a controller; a volatile storage device 420, such as DRAM; a nonvolatile storage device 430, such as a hard disc drive or flash memory; a display unit 440, such as a liquid crystal display; an operating unit 450 that includes a mouse, a key board, and the like; and a communication unit 480. The communication unit 480 includes an interface for connecting to an external device, such as the printer 100, and is used for performing data communications with the external device.

The volatile storage device 420 includes a buffer region 421 for temporarily storing various intermediate data used by the CPU 410 when the CPU 410 executes programs (driver program PG described later, for example).

The driver program PG is stored in the nonvolatile storage device 430 serving as an example of a storage unit. The driver program PG may be recorded on a DVD-ROM or the like, or may be made available for download from a server over a network. By executing the driver program PG, the CPU 410 of the personal computer 400 can execute various operations, such as a print data generating process (FIG. 6) described later to control the printer 100.

Additionally, a color conversion profile PFD is stored in the nonvolatile storage device 430. This color conversion profile PFD is produced by the manufacturer of the printer 100, for example, according to a method described later. The color conversion profile PFD is provided together with the driver program PG, for example.

A-2. Print Modes

Figure 3A:
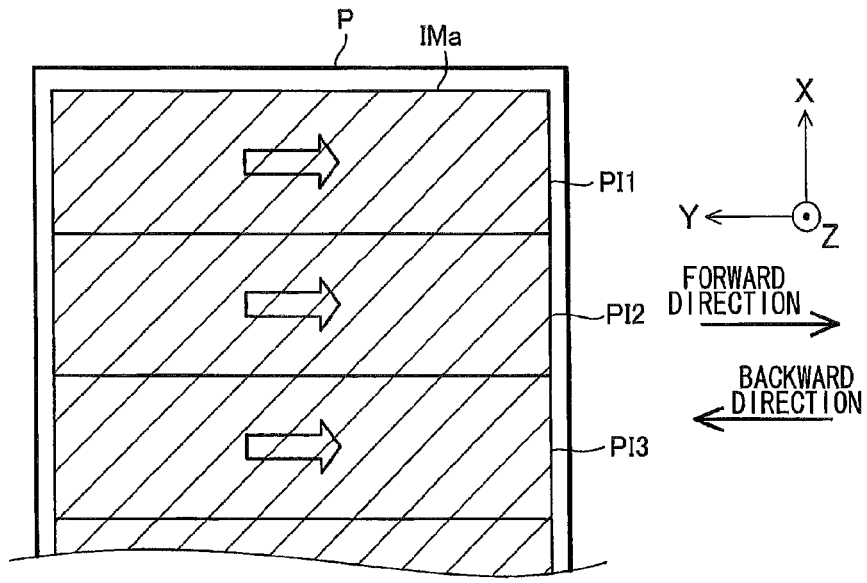
FIG. 3A is an explanatory diagram showing a normal mode.
Figure 3B:
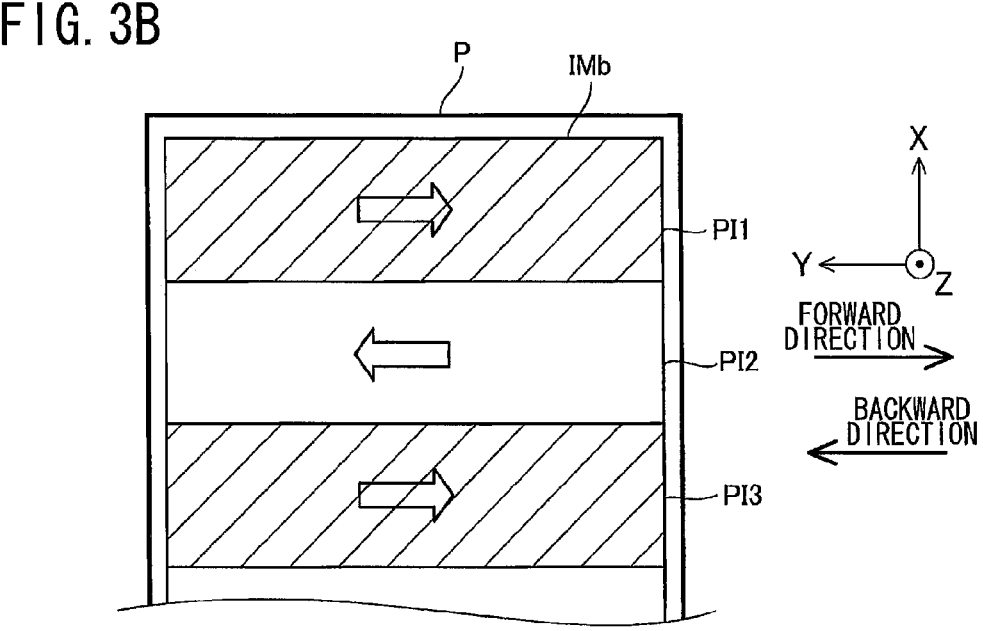
FIG. 3B is an explanatory diagram showing a high-speed mode.

Next, print modes of the printer 100 according to the first embodiment in which the CPU 110 executes printing operations using the print executing unit 200 will be described. FIGS. 3A and 3B are explanatory diagrams illustrating the print modes of the first embodiment.

The CPU 110 controls the main scanning unit 210, the sub scanning unit 220, and the head driving unit 240 to perform a printing operation by repeatedly alternating between execution of a unit print and execution of a unit sub scan. The CPU 110 is configured to perform a unit print by executing a main scan and driving the print head 230 while the sheet P is not being conveyed.

The CPU 110 is configured to execute a forward print or a backward print as the unit print. The forward print is a unit print for forming dots during the forward pass of a main scan (i.e., a main scan in the forward direction). A backward print is a unit print for forming dots during the backward pass of a main scan (i.e., a main scan in the backward direction).

The printing method used in the first embodiment is called single-pass printing in which the feed amount for one unit sub scan is equivalent to the nozzle length NL, and a printing area having a width in the sub scanning direction equivalent to the nozzle length NL is printed in one unit print. The image that is printed in a single unit print will be called a unit print image. The CPU 110 can perform single-pass printing in two print modes: a normal mode and a high-speed mode.

FIG. 3A shows a rough sketch of an image IMa printed on a sheet P in the normal mode. In the normal mode, the CPU 110 performs printing using only forward prints. That is, all n unit print images PI1-PIn in the image IMa (where n is a natural number) are printed using forward print. Thus, printing in the normal mode is called unidirectional printing.

FIG. 3B shows a general sketch of an image IMb printed on a sheet P during the high-speed mode. In the high-speed mode, the CPU 110 executes printing using a combination of forward prints and backward prints. That is, of the n unit print images PI1-PIn in the image IMb, odd-numbered unit print images in the printing order are printed with forward prints while even-numbered unit print images are printed with backward prints. Thus, printing in the high-speed mode is called bi-directional printing. In FIGS. 3A and 3B, forward images printed by a forward print are marked with hatching while backward images printed with backward prints are not marked with hatching for the first three unit print images PI1-PI3.

Since both forward prints and backward prints are used when printing in the high-speed mode, the printing speed in the high-speed mode is faster than the printing speed in the normal mode.

In some cases, the color tones produced when printing in the high-speed mode may differ depending on whether they are produced in a forward print or a backward print. This is because the order in which dots of each color are formed on the sheets P is different for a forward print and backward print due to the order in which the nozzle rows NC, NM, NY, and NK are arranged in the main scanning direction (see FIG. 2B). As described above, the nozzle rows in the first embodiment are arranged in the color order K, C, M, and Y from the upstream side in the forward direction (+Y side) toward the downstream side (−Y side), as shown in FIG. 2B. Consequently, dots are formed on paper in the color order Y, M, C, K in a single forward print and in the color order K, C, M, Y in a single backward print. Since these orders determine how dots are superimposed when dots of a plurality of colors are formed at the same position on the sheet P, the manner in which dots of each ink color are overlapped and the degree to which dots of each ink color are absorbed in the paper may differ between a forward print and a backward print.

A-3. Color Conversion Profile

The color conversion profile PFD in the first embodiment (FIG. 1) has been designed to suppress differences in color tone between forward prints and backward prints.

FIG. 4A shows an example of the color conversion profile PFD according to the first embodiment. The color conversion profile PFD defines correlations between color values in the RGB color space (hereinafter called RGB values) and color values in the CMYK color space (hereinafter called CMYK values). RGB values are color component values for each of the colors red (R), green (G), and blue (B), i.e., color values including an R value, G value, and B value. CMYK values are color component values corresponding to the colors of ink used in printing (C, M, Y, and K in the first embodiment), i.e., color values including a C value, M value, Y value, and K value. In the first embodiment, each of the R, G, B, C, M, Y, and K values is an 8-bit value (a possible 256 gradations). In other words, the color conversion profile PFD defines correlations between: a plurality of sets of specific color data each having a combination of color component values R, G, and B that are defined in the RGB color space serving as an example of a specific color space; and a plurality of sets of ink color data each having a combination of color component values C, M, Y, and K that are defined in the CMYK color space serving as an example of an ink color space.

More specifically, the color conversion profile PFD includes a lookup table LT, and reference information RI.

The lookup table LT correlates one combination of CMYK values with each of a plurality of representative combinations of RGB values (hereinafter called the "representative combinations"). As shown in FIG. 4A, 4913 combinations of RGB values are provided as the plurality of representative combinations. These representative combinations are obtained by finding all possible permutations of 17 specific values for each of the RGB colors spaced at substantially equal intervals between 0 and 255 (17×17×17). For example, the 17 specific values may include the 16 values represented by 16×m (where m is an integer from 0 to 15) and the value 255. That is, the 4913 representative combinations are a part of combinations of R, G, B component values that can be defined in the RGB color space. The numbers 1-4913 are assigned to these 4913 representative combinations and the 4913 combinations of CMYK values correlated with these representative combinations. This lookup table LT is created to enable the printing of images in suitable color tones when performing forward prints. Accordingly, the 4913 combinations of CMYK values corresponding to the representative combinations in the lookup table LT may be called forward-pass CMYK values.

The reference information RI specifies numbers between 1 and 4913 and is correlated with only some of the 4913 representative combinations (hereinafter called "referenced representative combinations"). In FIG. 4A, representative combinations numbered 292, 295, 296, 298, and 299 are examples of referenced representative combinations serving as at least one set of prescribed color data. The reference information RI specifies the number of a CMYK combination that is additionally associated with the referenced representative combination. CMYK values additionally associated with a referenced representative combination as the reference information RI are selected for printing images in suitable color tones when performing backward prints. Accordingly, the CMYK values additionally associated with referenced representative combinations as the reference information RI are called backward-pass CMYK values. That is, one combination each of forward-pass CMYK values and backward-pass CMYK values is associated with each referenced representative combination. In the example of FIG. 4A, CMYK combination number 292 is associated with representative combination number 292 as the forward-pass CMYK values, and CMYK combination number 294 is associated with the same representative combination number 292 as the backward-pass CMYK values.

All of the 4913 representative combinations that are not referenced representative combinations, i.e., the representative combinations not correlated with reference information RI (hereinafter called "non-referenced representative combinations") are only associated with forward-pass CMYK values in the lookup table LT and are not associated with backward-pass CMYK values. In the example of FIG. 4A, only CMYK combination number 290 is associated with representative combination number 290 as the forward-pass CMYK values.

As described above, the color conversion profile PFD may be defined as having a table that correlates one combination of forward-pass CMYK values with each of a plurality of representative combinations of RGB values and that further correlates one combination of backward-pass CMYK values with each of a plurality of referenced representative combinations among these plurality of representative combinations of RGB values. The plurality of combinations of forward-pass CMYK values serve as an example of a plurality of sets of first ink color data. The combination of backward pass CMYK values serves as an example of at least one set of second ink color data.

Further, the lookup table LT may be considered the main profile that defines correlations between RGB values and forward-pass CMYK values, while the reference information RI may be considered a sub profile that defines correlations between some of the combinations of RGB values in the lookup table LT and backward-pass CMYK values.

A-3. Method of Generating the Color Conversion Profile

Figure 5:
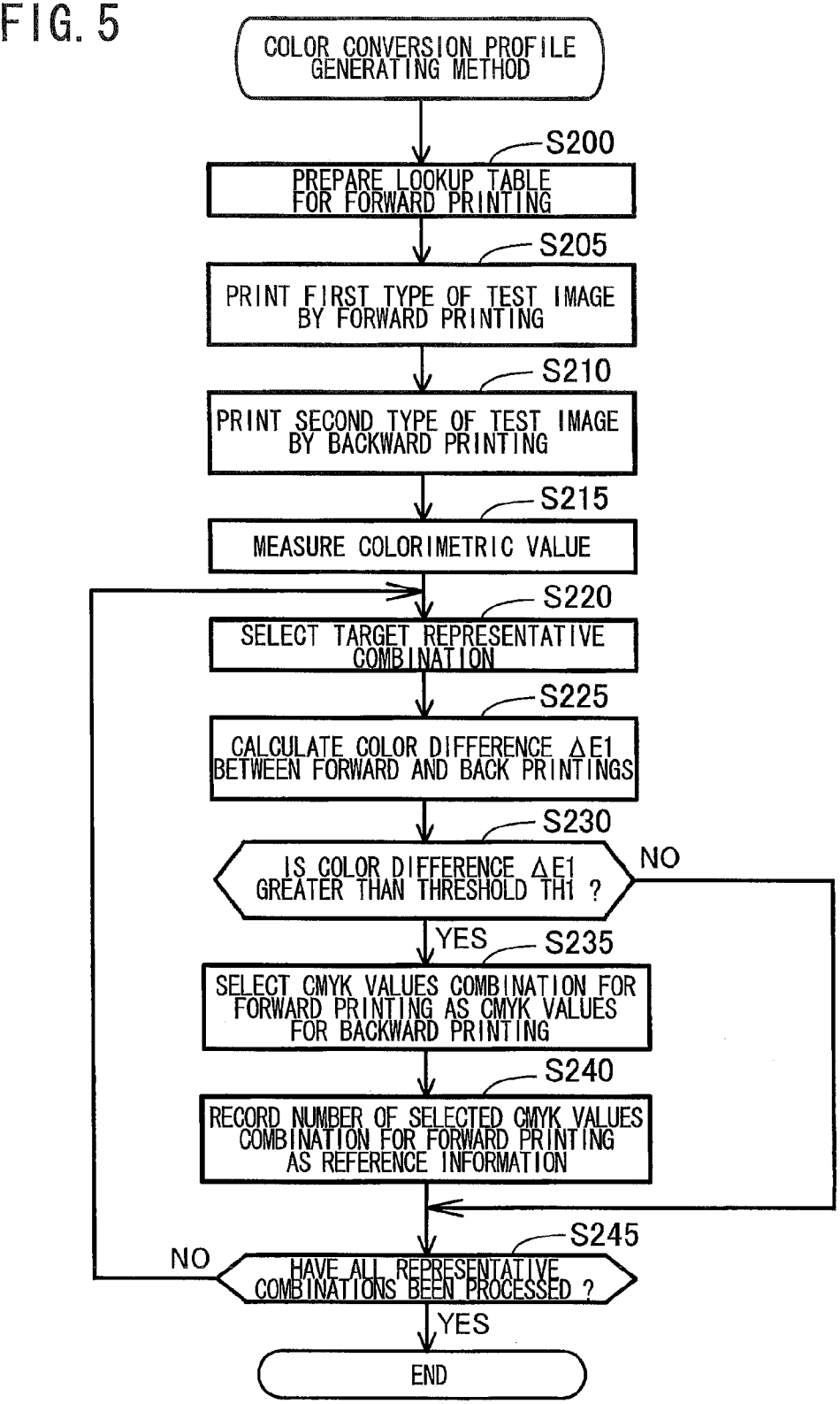
FIG. 5 is a flowchart illustrating steps in a color conversion profile generating method according to the first embodiment.

FIG. 5 is a flowchart illustrating steps in a method for generating the color conversion profile PFD (color conversion profile generating method) according to the first embodiment. The process for generating the color conversion profile PFD is executed by the manufacturer of the printer 100, for example.

In S200 of FIG. 5, the manufacturer prepares a lookup table LT for forward passes, such as the lookup table LT in FIG. 4A. The lookup table LT can be generated according to a method known in the art. For example, the manufacturer uses the printer 100 to print a plurality of test images (called "patches") through forward print using a plurality of CMYK combinations. Next, the manufacturer measures the color of each test image to obtain a plurality of colorimetric values indicating the colors of the plurality of test images. Finally, the manufacturer determines the 4913 CMYK combinations that correspond to the 4913 representative combinations based on these colorimetric values and target color values set for all or some of the 4913 representative combinations. A specific example of a method for generating a lookup table is described in Japanese unexamined patent application publication No. 2002-33930.

In S205 the manufacturer prints a plurality of test images of a first type. The first type of test images are forward images printed by forward print based on forward-pass CMYK values recorded in the lookup table LT. More specifically, the manufacturer prints 4913 test images of the first type using the printer 100.

In S210 the manufacturer prints a plurality of test images of a second type. The second type of test images are backward images printed by backward print based on forward-pass CMYK values recorded in the lookup table LT.

More specifically, the manufacturer prints 4913 test images of the second type using the printer 100. Note that the print data used for printing a first type of test image and a second type of test image based on specific CMYK values may be obtained by performing a halftone process on image data representing a single-color image configured of a plurality of pixels having the specific CMYK values, for example.

In S215 the manufacturer measures the printed test images and acquires colorimetric data comprising a plurality of colorimetric values. Colorimetric values are measured using a spectrophotometer or the like well-known in the art. The colorimetric values acquired through these measurements are color values for a color space not dependent on any device like the printer 100, for example. In the first embodiment, the colorimetric values are color values in the CIELAB color space (hereinafter simply called "Lab values"). The three Lab component values defined in the CIELAB color space are L* representing lightness, and a* and b* representing chroma and hue and will be called the L value, a value, and b value, respectively. In S215 the manufacturer specifically acquires first colorimetric data MC1 (FIG. 4B) that includes 4913 Lab value combinations acquired by measuring the 4913 test images of the first type, and second colorimetric data MC2 (FIG. 4B) that includes 4913 Lab value combinations acquired by measuring the 4913 test images of the second type. Hereinafter, Lab values obtained by measuring the first type of test image will be called colorimetric values of the first type, and Lab values obtained by measuring the second type of test image will be called colorimetric values of the second type. As shown in FIG. 4B, the number of the combination of forward-pass CMYK values on which the corresponding test image of the first type was based is assigned as an index to the corresponding colorimetric values of the first type. Similarly, the number of the combination of forward-pass CMYK values on which the corresponding test image of the second type was based is assigned as an index to the corresponding colorimetric values of the second type.

The CPU of a computer (not shown) possessed by the manufacturer, for example, executes the process in S220-S245 based on the lookup table LT, the colorimetric data MC1 and MC2.

In S220 the CPU selects one of the 4913 RGB representative combinations recorded in the lookup table LT as a target representative combination.

In S225 the CPU calculates a color difference ΔE1 for the target representative combination between a forward print and backward print. The color difference ΔE1 is the difference between the color of the first type of test image in question and the color of the second type of test image in question. The first type of test image in question is the first type of test image based on the forward-pass CMYK values associated with the target representative combination. The second type of test image in question is the second type of test image based on the forward-pass CMYK values associated with the target representative combination. The CPU calculates the color difference ΔE1 by finding the Euclidian distance in the CIELAB color space between the first type of colorimetric values representing the color of the first type of test image in question, and the second type of colorimetric values representing the color of the second type of test image in question.

In S230 the CPU determines whether the color difference ΔE1 calculated in S225 is greater than the prescribed threshold TH1. If the color difference ΔE1 is greater than the prescribed threshold TH1 (S230: YES), the target representative combination is designated a representative combination that must be associated with backward-pass CMYK values (the referenced representative combination described above). To do this, the CPU executes the processes in S235 and S240 described later in order to associate backward-pass CMYK values with the target representative combination. When the color difference ΔE1 is less than or equal to the prescribed threshold TH1 (S230: NO), the CPU skips the processes in S235 and S240 since the target representative combination need not be set as a referenced representative combination.

In S235 the CPU selects one combination of CMYK values from the 4913 combinations of forward-pass CMYK values recorded in the lookup table LT to be the backward-pass CMYK values associated with the target representative combination. More specifically, the CPU selects the second type of colorimetric values having the smallest color difference ΔE2 from the first type of colorimetric values representing the color of the first type of test image in question. Since the prescribed threshold TH1 described above is set to an appropriate value, the second type of colorimetric values selected in S235 are different from the second type of colorimetric values representing the color of the second type of test image in question. Accordingly, the color difference ΔE2 for the selected second type of colorimetric values is at minimum smaller than the color difference ΔE1 described above. The CPU selects the combination of forward-pass CMYK values used to form the second type of test image associated with the second type of colorimetric values selected above.

In S240 the CPU records the number of the combination of forward-pass CMYK values selected in S235 as the reference information RI in association with the target representative combination. As a result, the forward-pass CMYK values having this number are associated with the target representative combination as the backward-pass CMYK values.

In S245 the CPU determines whether all combinations of RGB values, i.e., all 4913 representative combinations recorded in the lookup table LT have been processed as the target representative combination. If there remain unprocessed representative combinations (S245: NO), the CPU returns to S220 and selects an unprocessed representative combination as the new target representative combination. When all representative combinations have been processed (S245: YES), the CPU ends the process for generating the color conversion profile PFD. Through the process described above, the manufacturer generates a color conversion profile PFD such as that shown in FIG. 4A.

Through the method of generating a color conversion profile PFD described above, referenced representative combinations of RGB values to be associated with backward-pass CMYK values are established among the 4913 representative combinations based on the colorimetric measurements for the first type and second type of test images. Specifically, the target representative combination is established as a referenced representative combination when the color difference ΔE1 between the color of a first type of test image, which is a forward image based on forward-pass CMYK values associated with the target representative combination, and the color of a second type of test image, which is a backward image based on forward-pass CMYK values associated with the target representative combination, is greater than the prescribed threshold TH1 (S230 of FIG. 5).

Here, a representative combination is more likely to be established as a referenced representative combination when the representative combination specifies a color formed with a relatively large area of overlap on the sheet P between two or more types of dots that differ in color since the color difference ΔE1 described above will be relatively large. For example, a color having a relatively high density and being near one of the hues R, G, and B is likely to be established as a referenced representative combination. As a specific example, a color near the primary color red ((R, G, B)=(255, 0, 0)) will likely be set as a referenced representative combination since the M dots and Y dots will likely overlap. Colors approaching the primary colors green and blue are similarly likely to be set as referenced representative combinations.

In contrast, representative combinations are likely to be set as non-referenced representative combinations, i.e., representative combinations not associated with backward-pass CMYK values when the representative combination represents a color having a relatively small area of overlap on the sheet P between two or more types of dots that differ in color since the color difference ΔE1 described above will be relatively small. For example, relatively light colors formed with fewer dots are more likely to be set as non-referenced representative combinations. Further, a color represented by dots of a single type of color, such as colors with a hue approaching one of the CMYK colors are likely to be set as non-referenced representative combinations irrespective of their densities.

When the target representative combination was established as a referenced representative combination (S230: YES), the CPU selects, from among the 4913 combinations recorded in the lookup table LT, frontward-pass CMYK values that produce the smallest color difference ΔE2 between the color of the second type of test image (a backward image) based on these color values, and the color of the first type of test image (a forward image) based on the forward-pass CMYK values associated with the target representative combination (S235 of FIG. 5). Next, the CPU sets the forward-pass CMYK values selected above as the backward-pass CMYK values to be associated with the target representative combination, and records reference information RI correlating these CMYK values with the target representative combination as backward-pass CMYK values (S240 of FIG. 5).

Thus, the color conversion profile PFD generated according to this method correlates both forward-pass CMYK values and backward-pass CMYK values with referenced representative combinations that represent colors producing a relatively large difference in color tone between a forward image printed by forward print and a backward image printed by backward print when the print data is generated using the lookup table LT. Accordingly, this method can generate a color conversion profile capable of suppressing differences in color tone between forward prints and backward prints of an image printed in a print data generating process described later (FIG. 6) based on print data generated using the color conversion profile PFD.

Since this method does not require two sets of CMYK values to be associated with each one of the 4913 representative combinations, the quantity of data in the color conversion profile is smaller than a profile that uses two lookup tables for forward passes and backward passes. Consequently, this method can reduce the amount of memory required in the nonvolatile storage device 430 for storing the color conversion profile PFD.

Further, the backward-pass CMYK values that are associated with referenced representative combinations are values selected from the 4913 combinations of forward-pass CMYK values recorded in the lookup table LT. Accordingly, suitable backward-pass CMYK values can be associated with referenced representative combinations simply by including the reference information RI in the color conversion profile PFD. Hence, this method further reduces the quantity of data in the color conversion profile.

A-4. Print Data Generating Process

Figure 6:
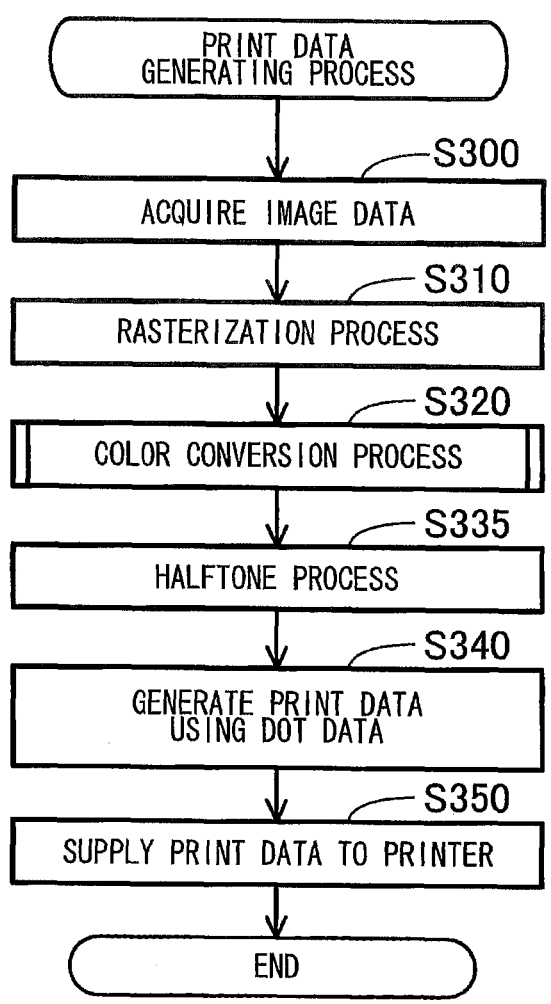
FIG. 6 is a flowchart illustrating steps in a print data generating process according to the first embodiment.

Next, the print data generating process will be described with reference to FIG. 6. The CPU 410 of the personal computer 400 (see FIG. 1) performs this process functioning as a printer driver by executing the driver program PG. The CPU 410 begins the print data generating process upon receiving a print request from the user via a user interface window (not shown). The print request includes a specification for image data representing an image to be printed, and a specification for the print mode, i.e., either the high-speed mode or the normal mode. FIG. 6 is a flowchart illustrating steps in the print data generating process.

In S300 of FIG. 6, the CPU 410 acquires image data representing an image to be printed generated by an application program (not shown), for example. This image data may include bitmap data, vector data representing diagrams and the like in a two-dimensional coordinate system, and character data and data defining layout positions of the characters.

In S310 the CPU 410 executes a rasterization process on the image data acquired in S300 to generate RGB image data representing the color of each of a plurality of pixels in RGB values. Through this process the CPU 410 acquires RGB image data, which is the target image data of the first embodiment.

In S320 the CPU 410 executes a color conversion process on the RGB image data using the color conversion profile PFD to generate CMYK image data representing the color of each of a plurality of pixels in CMYK values. This color conversion process will be described later in greater detail.

In S335 the CPU 410 executes a halftone process on the CMYK image data to generate dot data representing the dot formation state for each of the CMYK color components of each pixel. The dot formation state in the dot data represented by the color component value of each pixel may be one of the states "dot" and "no dot." Alternatively, the dot formation states may include the four states "large dot," "medium dot," "small dot," and "no dot." The halftone process is implemented using a well-known technique such as the dither method or the error diffusion method.

In S340 the CPU 410 generates print data based on the dot data generated in S335. More specifically, the CPU 410 generates print data that the printer 100 can interpret by arranging the dot data in an order used for unit prints and adding various commands to the dot data.

In S350 the CPU 410 supplies the print data generated in S340 to the printer 100. When the printer 100 receives this print data, the CPU 110 of the printer 100 controls the print executing unit 200 to print images based on the print data.

A-5. Color Conversion Process

Figure 7:
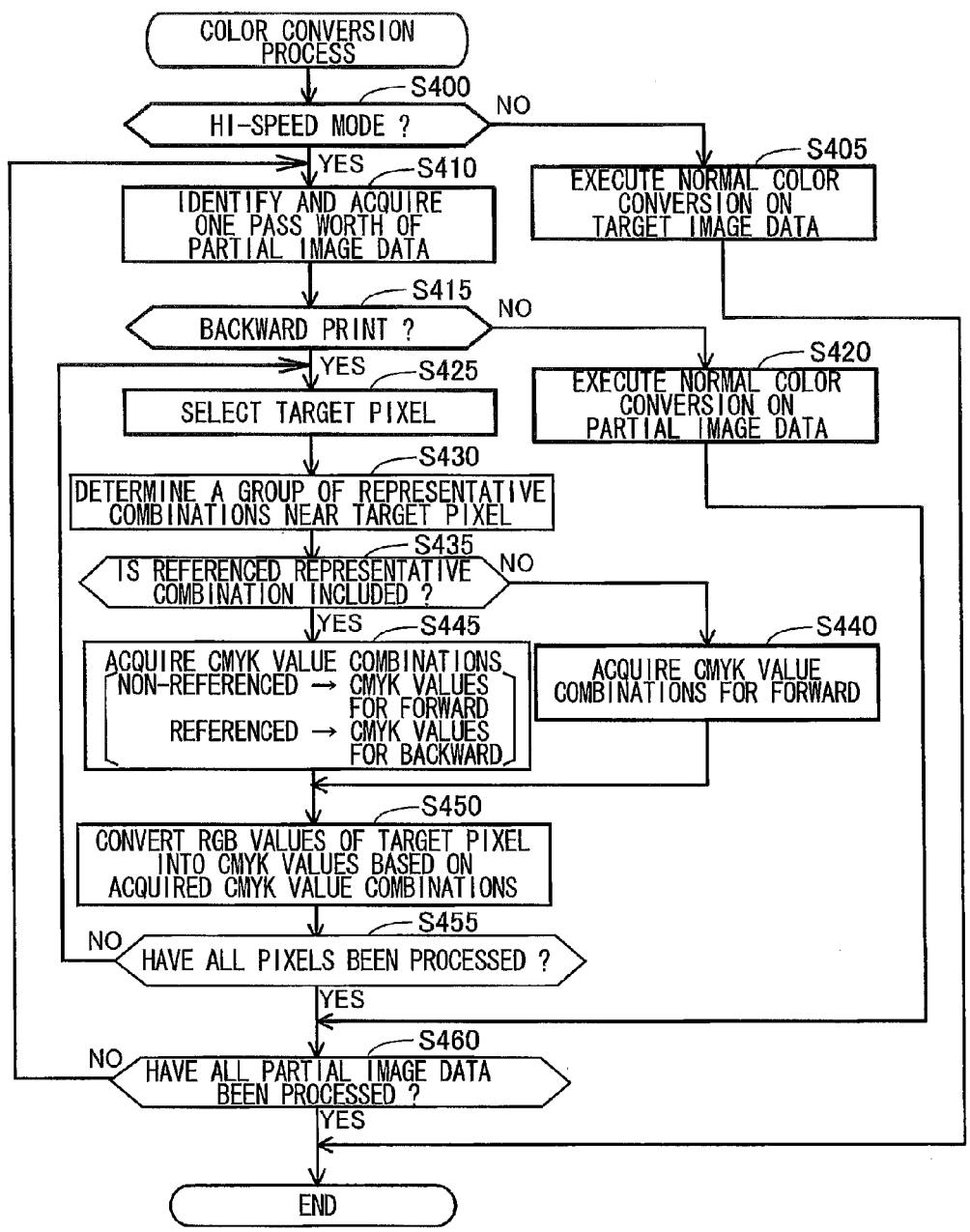
FIG. 7 is a flowchart illustrating steps in a color conversion process according to the first embodiment.

Next, the color conversion process in S320 of FIG. 6 will be described. FIG. 7 is a flowchart illustrating steps in the color conversion process according to the first embodiment. In S400 of FIG. 7, the CPU 410 determines whether the print mode specified by the user is the high-speed mode.

If the user-specified print mode is the normal mode (S400: NO), in S405 the CPU 410 executes a normal color conversion process on all RGB image data set as the target image data, and subsequently ends the color conversion process of FIG. 7. The normal color conversion process uses the lookup table LT for forward printing included in the color conversion profile PFD described above. The normal color conversion process does not use the reference information RI included in the color conversion profile PFD. Hence, the CPU 410 executes the normal color conversion process using the forward-pass CMYK values recorded in the lookup table LT but not the backward-pass CMYK values. The normal color conversion process is executed according to a method well known in the art.

However, when the CPU 410 determines in S400 that the specified print mode is the high-speed mode (S400: YES), the CPU 410 executes a high-speed color conversion process in S410-S460.

In S410 the CPU 410 identifies and acquires one pass worth of partial image data from the RGB image data acquired in S310. Here, one pass worth of partial image data is data representing a partial image to be printed in one unit print (that is, either a forward print or a backward print). More specifically, the CPU 410 identifies and acquires partial image data for a prescribed number of lines, beginning from the top of the remaining unprocessed data in the RGB image data.

In S415 the CPU 410 determines whether the unit print to be executed on the basis of the acquired partial image data is a backward print. When the unit print to be executed is a forward print (S415: NO), i.e., when the partial image data acquired in S410 is forward image data, in S420 the CPU 410 executes the normal color conversion process described above on the forward image data and subsequently advances to S460. Hence, the CPU 410 executes a color conversion process on the forward image data using the forward-pass CMYK values recorded in the lookup table LT. In other words, the CPU 410 executes a color conversion process on the forward image data by using correlations between representative combinations of RGB values and combinations of CYMK values for the forward print defined in the lookup table LT.

However, when the unit print to be executed is a backward print (S415: YES), i.e., when the partial image data acquired in S410 is backward image data, the CPU 410 executes a color conversion process on the backward image data in S425-S450.

In S425 the CPU 410 selects, as a target pixel, one of the plurality of pixels in the backward image represented by the target backward image data.

In S430 the CPU 410 determines, from the 4913 representative combinations of RGB values recorded in the lookup table LT, a group of representative combinations of RGB values positioned near the RGB values of the target pixel in the RGB color space. The group of representative combinations selected in S430 includes the four representative combinations whose Euclidean distances from the RGB values of the target pixel in the RGB color space are the four shortest.

In S435 the CPU 410 references the color conversion profile PFD (FIG. 4A) to determine whether the four representative combinations selected in S430 include a representative combination associated with reference information RI (i.e., a referenced representative combination).

If the four representative combinations include a referenced representative combination (S435: YES), in S445 the CPU 410 acquires the four combinations of CMYK values corresponding to the four representative combinations from the color conversion profile PFD. In this process, the CPU 410 acquires backward-pass CMYK values for the referenced representative combinations among the four representative combinations and acquires forward-pass CMYK values for the representative combinations not associated with reference information RI (i.e., the non-referenced representative combinations).

However, if the four representative combinations set in S430 do not include a referenced representative combination (S435: NO), in S440 the CPU 410 acquires the four combinations of forward-pass CMYK values corresponding to the four representative combinations from the color conversion profile PFD.

In S450 the CPU 410 converts the RGB values for the target pixel to CMYK values based on the four combinations of CMYK values acquired in S440 or S445. More specifically, the CPU 410 performs a prescribed interpolation process on the four combinations of CMYK values to determine CMYK values to be used as the converted values for the target pixel. In the first embodiment, the CPU 410 performs triangular pyramid interpolation.

In S455 the CPU 410 determines whether all pixels in the backward image represented by the backward image data have been selected for processing as the target pixel. If there remain unprocessed pixels (S455: NO), the CPU 410 returns to S425 and selects an unprocessed pixel as the new target pixel. When all pixels have been processed (S455: YES), the CPU 410 advances to S460.

In S460 the CPU 410 determines whether all partial image data have been processed, i.e., whether the color conversion process has been completed for all RGB image data. If there remains unprocessed partial image data (S460: NO), the CPU 410 returns to S410 and acquires unprocessed partial image data. When all partial image data has been processed (S460: YES), the CPU 410 ends the color conversion process of FIG. 7.

In the color conversion process of FIG. 7 according to the first embodiment, when the personal computer 400 is operating in the high-speed mode, the CPU 410 executes the color conversion on forward image data representing forward images in the RGB image data using forward-pass CMYK values corresponding to the representative combinations of RGB values recorded in the color conversion profile PFD (S420 of FIG. 7). The CPU 410 also executes the color conversion on backward image data representing a backward image in the RGB image data using backward-pass CMYK values corresponding to the referenced representative combinations recorded in the color conversion profile PFD for prescribed RGB values. The prescribed RGB values indicate a combination of RGB values corresponding to at least one of referenced representative combinations in S435. More specifically, when the four representative combinations set in S435 for the target RGB values include at least one referenced representative combination, the CPU 410 executes the color conversion process using backward-pass CMYK values corresponding to the at least one or more representative combinations (S445, S450 of FIG. 7). In this way, the CPU 410 converts prescribed RGB values to differing CMYK values, i.e., to forward-pass CMYK values and backward-pass CMYK values, through a color conversion process on forward image data and a color conversion process on backward image data. Thus, the CPU 410 can execute suitable color conversion processes for both forward image data and backward image data. Accordingly, this method can suppress differences in color tones produced in the printed image between forward images and backward images.

Further, the CPU 410 executes a color conversion process on backward image data using forward-pass CMYK values associated with non-referenced representative combinations recorded in the color conversion profile PFD for RGB values other than the prescribed RGB values. More specifically, when all four of the representative combinations set in S435 for the target RGB values are non-referenced representative combinations, the CPU 410 executes color conversion using only forward-pass CMYK values associated with these representative combinations (S440, S450 of FIG. 7). Thus, the CPU 410 converts RGB values different from the prescribed RGB values to the same forward-pass CMYK values whether performing color conversion on backward image data or color conversion on forward image data. Since this method does not require a plurality of combinations of CMYK values to be associated with the RGB values different from the prescribed RGB values in the color conversion profile PFD, the data amount of the color conversion profile PFD can be reduced.

As described above in the first embodiment, the prescribed RGB values are values determined in S435 that the four representative combinations set in S430 include at least one referenced representative combination. In other words, the referenced representative combinations are included in the prescribed RGB values. RGB values other than prescribed RGB values are values determined in S435 that the four representative combinations set in S430 include only non-referenced representative combinations. Thus, the non-referenced representative combinations are included in the RGB values other than the prescribed RGB values.

As described in S230 of the process in FIG. 5 for generating the color conversion profile PFD, the referenced representative combinations constituting part of the prescribed RGB values are representative combinations producing a difference in color greater than the prescribed threshold TH1 between its first type of test image and second type of test image when printed based on the corresponding forward-pass CMYK values. Therefore, the difference between a color printed through forward print based on the forward-pass CMYK values corresponding to the prescribed RGB values and the color printed through backward print based on the same forward-pass CMYK values can be said to be greater than a specific threshold. As a result, prescribed RGB values representing colors that produce a great difference in color tone between forward images and backward images when undergoing the same color conversion process are appropriately converted to different CMYK values when performing a color conversion process on forward image data and when performing a color conversion process on backward image data. Other RGB values representing colors that do not produce a great difference in color tone between forward images and backward images even when undergoing the same color conversion process are converted to the same CMYK values whether performing color conversion on forward image data or backward image data. As a result, this method can suitably suppress a difference in color tone between forward images and backward images while suppressing the quantity of data in the color conversion profile PFD.

As described in S235 of FIG. 5 in the process for generating the color conversion profile PFD, backward-pass CMYK values associated with a referenced representative combination are values selected from the plurality of forward-pass CMYK values associated with the plurality of representative combinations of RGB values recorded in the lookup table LT. Thus, by including the reference information RI in the color conversion profile PFD, suitable backward-pass CMYK values can be associated with referenced representative combinations. Accordingly, the quantity of data in the color conversion profile PFD can be further reduced.

Further, as described in S235 of FIG. 5 in the process for generating the color conversion profile PFD, backward-pass CMYK values are values selected from the plurality of forward-pass CMYK values in order to minimize the difference between a color printed through backward print based on these CMYK values (the color of the second type of test image) and a color printed through forward print based on the forward-pass CMYK values associated with the RGB values corresponding to these CMYK values (the color of the first type of test image). Accordingly, this method can better suppress the difference in color tone produced between forward images and backward images without increasing the quantity of data in the color conversion profile PFD.

The print executing unit 200 in the printer 100 of the first embodiment can print in either the normal mode for executing only forward prints or the high-speed mode for executing bi-directional printing. When the printing mode is set to the normal mode in the color conversion process of FIG. 7 (S400: NO), the CPU 410 executes color conversion using the lookup table LT as the main profile and not using the reference information RI as the sub profile (S405). However, when the printing mode is set to the high-speed mode (S400: YES), the CPU 410 executes color conversion using both the lookup table LT as the main profile and the reference information RI as the sub profile (S430-S450). Accordingly, the CPU 410 can suitably generate print data for the normal mode and print data for the high-speed mode. Further, the CPU 410 can suppress the quantity of data in the color conversion profile PFD required for the two modes.

B. Second Embodiment

The content in the color conversion profile and color conversion process according to a second embodiment differs from that in the first embodiment described above. The following description covers the differences of the second embodiment from the first embodiment.

B-1. Color Conversion Profile

FIG. 8 shows an example of a color conversion profile PFD2 according to the second embodiment. The color conversion profile PFD2 in FIG. 8 includes a first table PT1 and a second table PT2. The first table PT1 correlates one combination of separate RGB values (hereinafter called R'G'B' values) with each of the prescribed RGB values described in the first embodiment. The first table PT1 does not define correlations between RGB values and R'G'B' values for RGB values other than the prescribed RGB values. The second table PT2 is identical to the lookup table LT that is included in the color conversion profile PFD of the first embodiment (FIG. 4A).

B-2. Method for Generating the Color Conversion Profile

Figure 9:
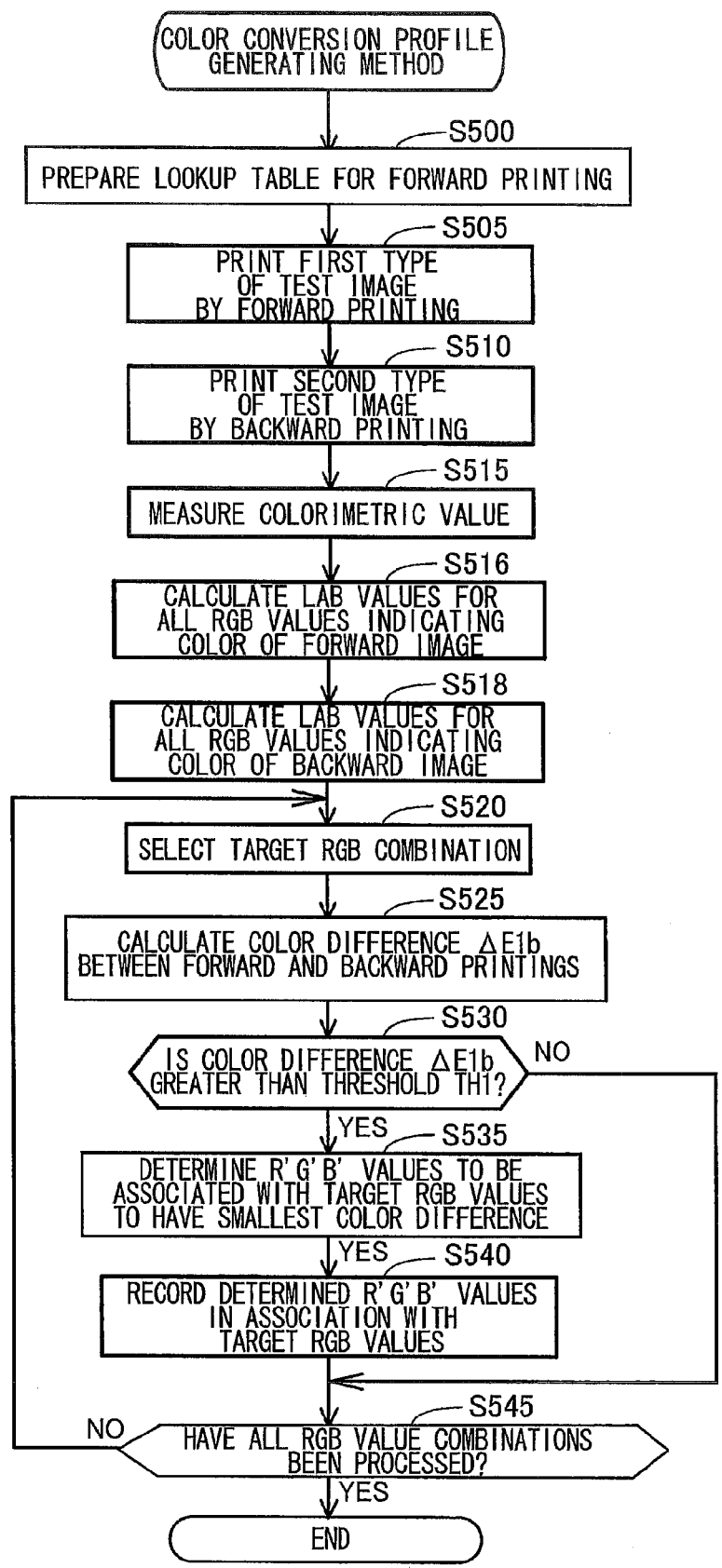
FIG. 9 is a flowchart illustrating steps in a color conversion profile generating method according to the second embodiment.

FIG. 9 is a flowchart illustrating steps in a color conversion profile generating method for generating the color conversion profile PFD2 in the second embodiment. Steps S500-S515 in FIG. 9 are identical to steps S200-S215 in FIG. 5 of the first embodiment. The CPU of a computer (not shown) possessed by the manufacturer, for example, executes the process in S516-S545 based on the lookup table LT (i.e., the second table PT2), and the colorimetric data MC1 and MC2 (FIG. 4B).

In S516 the CPU calculates Lab values for all combinations of RGB values (256×256×256 combinations in the second embodiment) each indicating the color of the corresponding forward image. The color of a forward image corresponding to a single combination of RGB values is the color of the forward image printed based on the forward-pass CMYK values associated with the RGB combination.

The process for calculating Lab values specifying the color of a forward image corresponding to a combination of RGB values will be described here. As in S430 of FIG. 7 in the first embodiment, the CPU selects four representative combinations from among the 4913 representative combinations of RGB values recorded in the lookup table LT (the second table PT2) that are positioned nearest the combination of RGB values in question. The CPU calculates the Lab values indicating the color of the forward image corresponding to the combination of RGB values in question by performing triangular pyramid interpolation using the four combinations of first type of colorimetric values (Lab values) corresponding to the four representative combinations selected above. Here, the four combinations of first type of colorimetric values corresponding to the four representative combinations are the four combinations of first type of colorimetric values indicating the colors of the four first type of test images that were printed based on the four combinations of forward-pass CMYK values associated with the four representative combinations. In other words, the first type of colorimetric values corresponding to the representative combination are the first type of colorimetric values having the same number as the representative combination from among the 4913 combinations of the first type of colorimetric values in the first colorimetric data MC1 (FIG. 4B). This calculation is repeatedly executed for all combinations of RGB values to find the Lab values that indicate the colors of the forward images corresponding to these combinations of RGB values.

In S518 the CPU calculates the Lab values indicating the colors of backward images corresponding to all combinations of RGB values. The color of a backward image corresponding to a combination of RGB values denotes the color of the backward image printed based on the forward-pass CMYK values associated with the combination of RGB values. The Lab values indicating the color of a backward image can be calculated according to the same method of calculating the Lab values indicating the color of a forward image by using the second type of colorimetric values in the second colorimetric data MC2 (FIG. 4B) in place of the first type of colorimetric values used in S518 for calculating the Lab values of a forward image.

In S520 the CPU selects one target combination of RGB values from the plurality of combinations.

In S525 the CPU calculates a color difference $\Delta E1b$ between a forward image and backward image for the target RGB values. More specifically, the CPU acquires Lab values specifying the color of the forward image corresponding to the target RGB values from among the Lab values specifying colors of forward images that were calculated in S516. Next, the CPU acquires Lab values specifying the color of a backward image corresponding to the target RGB values from among the Lab values specifying colors of backward images that were calculated in S518. Subsequently, the CPU calculates the color difference $\Delta E1b$ by finding the Euclidean distance between the Lab values specifying the color of the forward image corresponding to the target RGB values and the Lab values specifying the color of the backward image corresponding to the target RGB values.

In S530 the CPU determines whether the color difference $\Delta E1b$ calculated in S525 is greater than the prescribed threshold TH1. If the color difference $\Delta E1b$ is greater than the prescribed threshold TH1 (S530: YES), then the target RGB values are established as prescribed RGB values to be associated with backward-pass CMYK values. Consequently, the CPU executes the processes in S535 and S540 described below in order to associate backward-pass CMYK values with the target RGB values. However, if the color difference $\Delta E1b$ is less than or equal to the prescribed threshold TH1 (S530: NO), the CPU skips the processes in S535 and S540 since the target RGB values need not be established as prescribed RGB values to be associated with backward-pass CMYK values.

In S535 the CPU determines R'G'B' values to be associated with the target RGB values. The R'G'B' values are set to minimize a color difference $\Delta E2b$ between the color of the forward image corresponding to the target RGB values and the color of the backward image corresponding to the R'G'B' values. More specifically, the CPU selects a combination of Lab values from among the Lab values specifying colors of backward images calculated in S518 that have the smallest difference in color from the Lab values specifying the color of the forward image corresponding to the target RGB values. The CPU sets the RGB values corresponding to these Lab values as the R'G'B' values to be associated with the target RGB values.

In S540 the CPU records the R'G'B' values determined in S535 in a table in association with the target RGB values. In this way, the forward-pass CMYK values correlated with the R'G'B' values determined in S535 are associated with the target RGB values through these R'G'B' values as the backward-pass CMYK values.

In S545 the CPU determines whether all of the combinations of RGB values have been processed as the target RGB values. When there remain unprocessed combinations of RGB values (S545: NO), the CPU returns to S520 and selects an unprocessed combination of RGB values as the new target RGB values. When all combinations of RGB values have been processed (S545: YES), the CPU ends the process for generating the color conversion profile PFD2. Through the process described above, a color conversion profile PFD2 similar to that shown in FIG. 8 is generated. That is, the lookup table LT prepared in S500 is set as the second table PT2 of FIG. 8, and the table recorded in S535 and S540 that defines correlations between prescribed RGB values and R'G'B' values is set as the first table PT1 in FIG. 8. Here, the second table PT2 can be considered the main profile defining correlations between RGB values and forward-pass CMYK values, while the first table PT1 can be considered a sub profile that is used together with the second table PT2 to define correlations between prescribed RGB values and backward-pass CMYK values.

According to the method of generating the color conversion profile PFD2 described above, the CPU determines which of the combinations of RGB values are to be set as prescribed RGB values associated with backward-pass CMYK values based on the results of colorimetric measurements for the first type of test images and second type of test images (S530).

When the target RGB values are determined as prescribed RGB values (S530: YES), the CPU selects backward-pass CMYK values to be associated with the target RGB values from among the forward-pass CMYK values correlated with RGB values in the lookup table LT (second table TP2) and determines the R'G'B' values corresponding to these CMYK values (S535 of FIG. 5). These R'G'B' values are recorded in a table in association with the target RGB values so that the forward-pass CMYK values correlated with the R'G'B' values can be associated with the target RGB values as backward-pass CMYK values (S540).

The color conversion profile PFD2 generated according to the above method correlates both forward-pass CMYK values and backward-pass CMYK values with prescribed combinations of RGB values representing colors that produce a relatively large color difference between forward images printed in forward print and backward images printed in backward print when print data is generated using the lookup table LT (the second table TP2). Consequently, this method can generate a color conversion profile capable of suppressing a difference in color tone between forward images and backward images when the images are printed based on print data generated in the print data generating process.

Further, since R'G'B' values are not recorded for all combinations of RGB values in the first table PT1, this method can reduce the amount of data in the color conversion profile.

B-3. Color Conversion Process

Figure 10:
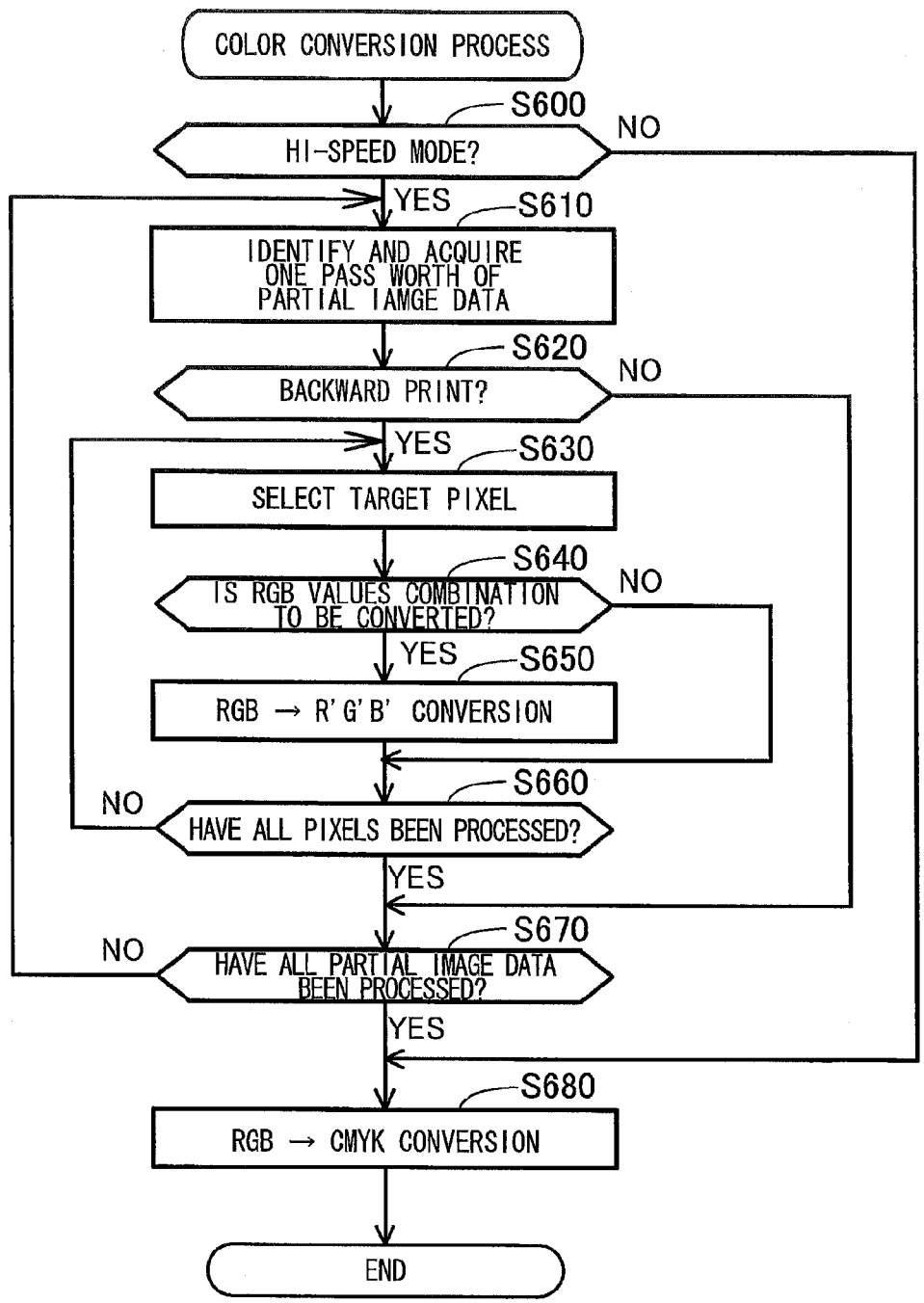
FIG. 10 is a flowchart illustrating steps in a color conversion process according to the second embodiment.

FIG. 10 is a flowchart showing the color conversion process according to the second embodiment. In S600 the CPU 410 determines whether the print mode specified by the user is the high-speed mode.

If the specified print mode is the normal mode (S600: NO), the CPU 410 skips the process in S610-S670 described later and advances directly to S680. When the specified print mode is the high-speed mode (S600: YES), the CPU 410 executes a high-speed mode pre-process in S610-S670.

In S610 the CPU 410 identifies and acquires one pass worth of partial image data from the RGB image data.

In S620 the CPU 410 determines whether the unit print to be executed based on the acquired partial image data is a backward print. When the unit print to be executed is a forward print (S620: NO), i.e., when the partial image data acquired in S610 is forward image data, the CPU 410 skips the process in S630-S660 described later and advances to S670. However, when the unit print to be executed is a backward print (S620: YES), i.e., when the partial image data acquired in S610 is backward image data, the CPU 410 executes the process in S630-S660.

In S630 the CPU 410 selects, as a target pixel, one of the plurality of pixels in the backward image represented by the target backward image data.

In S640 the CPU 410 determines whether the RGB values of the target pixel are candidates for conversion in the pre-process (whether the RGB values of the target pixel are to be converted before the RGB-CMYK conversion). Specifically, the CPU 410 references the first table PT1 in FIG. 8 to determine whether a correlation between RGB values and R'G'B' values for the target pixel are recorded in the first table PT1. The CPU 410 determines that the RGB values of the target pixel are candidates for conversion when such a correlation is recorded in the first table PT1, and determines that the RGB values are not candidates for conversion when a correlation is not recorded in the first table PT1.

When the CPU 410 determines that the RGB values of the target pixel are candidates for conversion (S640: YES), in S650 the CPU 410 converts the RGB values of the target pixel to R'G'B' values based on the correlation recorded in the first table PT1. When the RGB values of the target pixel are determined not to be candidates for conversion (S640: NO), the CPU 410 skips the process in S650.

In S660 the CPU 410 determines whether all pixels in the backward image represented by the backward image data being processed have been selected for processing as the target pixel. If there remain unprocessed pixels (S660: NO), the CPU 410 returns to S630 and selects an unprocessed pixel as the new target pixel. When all pixels have been processed (S660: YES), the CPU 410 advances to S670.

In S670 the CPU 410 determines whether all partial image data has been processed. If there remains unprocessed partial image data (S670: NO), the CPU 410 returns to S610 and acquires unprocessed partial image data. When all partial image data has been processed (S670: YES), the CPU 410 advances to S680. At this point, all prescribed RGB values among the plurality of combinations of RGB values for all backward image data included in the RGB image data have been converted to the corresponding R'G'B' values, and all RGB values other than the prescribed RGB values have been kept at their original values. Further, the combinations of RGB values in all forward image data included in the RGB image data have also been kept at their original values.

In S680 the CPU 410 executes a color conversion process on the RGB image data, produced after the prescribed RGB values were converted to R'G'B' values, in order to convert the RGB values in the RGB image data to CMYK values. The CPU 410 executes this process using the second table PT2 in the color conversion profile PFD2 (i.e., the lookup table LT) and is identical to the normal color conversion process described in S405 of FIG. 7. As a result of this process, the CPU 410 generates CMYK image data.

In the color conversion process of FIG. 10 according to the second embodiment described above, when the personal computer 400 is operating in the high-speed mode, the CPU 410 executes color conversion on forward image data using the second table PT2 but not the first table PT1 (S520: NO, S580). The CPU 410 also executes color conversion on backward image data using both the first table PT1 and second table PT2 (S520: YES, S530-S560, S580). As a result, the CPU 410 converts all prescribed RGB values among the plurality of RGB values in all backward image data in the RGB image data to backward-pass CMYK values through R'G'B' values and converts RGB values other than the prescribed RGB values to forward-pass CMYK values. The CPU 410 also converts the plurality of RGB values in all forward image data of the RGB image data to forward-pass CMYK values, regardless of whether the RGB values are prescribed RGB values. Thus, the CPU 410 can execute suitable color conversion processes for forward image data and for backward image data, as in the first embodiment described above. Accordingly, this method can suppress differences in color tone produced in the printed image between forward images and backward images.

C. Variations of the Embodiments (1) In S235 of the print data generating process of the first embodiment described above (FIG. 5), when selecting backward-pass CMYK values to be associated with the target representative combination from among the plurality (4913 in the first embodiment) of forward-pass CMYK values recorded in the lookup table LT, the CMYK values are selected to minimize a color difference 4E2 between each of the colors of backward images (second type of test images) based on these CMYK values and the color of a forward image (first type of test image) based on forward-pass CMYK values associated with the target representative combination. However, it is also possible to select backward-pass CMYK values to be associated with the target representative combination from the plurality of forward-pass CMYK values so that the color difference ΔE2 is smaller than the color difference ΔE1. As described in the first embodiment, the color difference ΔE1 is the difference between the color of a forward image based on the forward-pass CMYK values correlated with the target representative combination, and the color of a backward image based on these same forward-pass CMYK values. This method can suppress differences in color tone between forward images and backward images.

Figure 11:
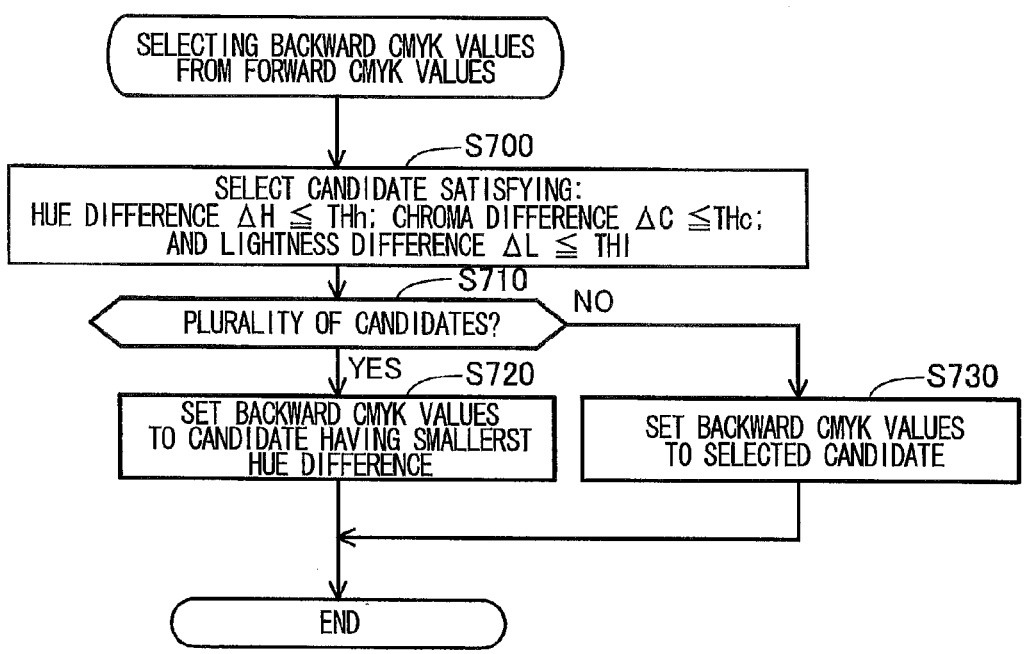
FIG. 11 is a flowchart illustrating steps in a process for selecting backward CMYK values from forward CMYK values.

FIG. 11 is a flowchart illustrating steps in a different method of selecting backward-pass CMYK values to be associated with the target representative combination from the plurality of combinations of forward-pass CMYK values. In S700 of FIG. 11, the CPU 410 selects CMYK values from the plurality of forward-pass CMYK values recorded in the lookup table LT that satisfy selection conditions for hue H, chroma C, and lightness L as candidates for the CMYK values. The selection conditions require that, when comparing the color of a second type of test image based on these CMYK values with the color of a first type of test image based on the forward-pass CMYK values correlated with the target representative combination, a difference in hue ΔH is no greater than a prescribed threshold THh, a difference in chroma ΔC is no greater than a prescribed threshold THc, and a difference in lightness ΔL is no greater than a prescribed threshold TH1.

Note that hue H is expressed as an angle relative to the a*-axis in the a*b* plane of the CIELAB color space. Further, chroma C is expressed as the distance from the L*-axis (achromatic axis) in the CIELAB color space, and lightness L is represented by the value of L* in the CIELAB color space. Hence, if the colorimetric values (Lab values) indicating the color of the test image are represented by (L*, a*, b*), then the hue H, chroma C, and lightness L in the test image are expressed by the following equations.

$$H = \tan^{-1}(b^*/a^*)$$

$$C = \{(a^*)^2 + (b^*)^2\}^{1/2}$$

$$L = L^*$$

In S710 the CPU 410 determines whether a plurality of candidate combinations for CMYK values have been selected. When a plurality of CMYK candidates have been selected (S710: YES), in S720 the CPU 410 sets the backward-pass CMYK values to the candidate CMYK values having the smallest difference in hue ΔH. However, if only one CMYK candidate was selected (S710: NO), in S730 the CPU 410 sets the backward-pass CMYK values to the only candidate CMYK values.

While not indicated in the drawings, if a single candidate for CMYK values was not selected, the thresholds THh, THc, and TH1 are increased a prescribed percentage (10%, for example), and the process of S700-S730 is repeated.

As described above, in this variation of the embodiments, candidates for CMYK values are selected by determining whether the difference in hue ΔH, difference in chroma ΔC, and difference in lightness ΔL between the color printed by forward print (i.e., the color of the first type of test image) and the color printed by backward print (i.e., the color of the second type of test image) are all no greater than corresponding reference values (i.e., the thresholds THh, THc, and TH1). When a plurality of candidates are selected, the candidate having the smallest difference in hue ΔH is chosen as the backward-pass CMYK values because the difference in hue ΔH is more noticeable than the difference in chroma ΔC and difference in lightness ΔL to the human eye. Since the backward-pass CMYK values to be correlated with the representative combination are selected in this variation by giving priority to assessing the difference in hue ΔH over the difference in chroma ΔC and difference in lightness ΔL, the method of this variation can more reliably prevent a difference in color tone between forward images and backward images from being noticeable. Further, candidates for CMTK values may be selected by determining whether the difference in at least one of difference in either one of chroma and lightness between the color printed by the forward image and the backward image is smaller than a threshold THc, TH1, in addition to determination of difference in hue ΔH between the color printed by the forward image and the backward image.

Also, when setting R'G'B' values to be correlated with the target RGB values in S535 of FIG. 9 in the process for generating a color conversion profile according to the second embodiment, the R'G'B' values may be selected by giving priority to assessing the difference in hue between the color of the forward image corresponding to the target RGB values and the color of the backward image corresponding to the R'G'B' values over the differences in chroma and lightness.

(2) The color conversion profile PFD in the first embodiment described above (FIG. 4A) correlates forward-pass CMYK values with all representative combinations in the lookup table LT and correlates backward-pass CMYK values with some of the representative combinations through the reference information RI. As an alternative, the color conversion profile may correlate backward-pass CMYK values with all representative combinations in the lookup table LT and may correlate forward-pass CMYK values with some of the representative combinations through the reference information RI. In this case, the color conversion process performed on backward image data in the color conversion process of FIG. 7 is executed using only backward-pass CMYK values recorded in the lookup table LT. The color conversion process for forward image data is executed using backward-pass CMYK values recorded in the lookup table LT and forward-pass CMYK values correlated with some of the representative combinations through the reference information RI.

(3) The color conversion profile PFD2 according to the second embodiment described above (FIG. 8) includes the first table PT1 that correlates prescribed RGB values, i.e., a portion of the RGB combinations, with R'G'B' values; and the second table PT2 serving as a color conversion table for forward passes. Hence, the second table PT2 correlates forward-pass CMYK values with all representative combinations of RGB values, while the second table PT2 and first table PT1 together correlate backward-pass CMYK values with prescribed RGB values. As an alternative, the color conversion profile may include a first table that correlates some of the combinations of RGB values with R'G'B' values, and a second table that serves as a color conversion table for backward passes. Hence, the second table correlates backward-pass CMYK values with all combinations of RGB values, while the second table and first table together correlate forward-pass CMYK values with some of the combinations of RGB values. In this case, the CPU 410 may execute the process in S630-S660 on forward image data in the color conversion process of FIG. 10 while not executing the process on backward image data.

(4) In the embodiments described above, the color conversion profile serves to convert RGB values to CMYK values. However, color values in a different color space may be used in place of the RGB values, such as color values in the HSV color space or color values in the YCbCr color space. Similarly, in place of the CMYK values, the color conversion profile may use CMY values in a CMY color space that has C, M, and Y as color components but not K. In general, the color conversion profile may be any profile that defines correlations between color values in a specific color space, and color values in an ink color space that includes a plurality of component values corresponding to the plurality of ink colors used for printing.

(5) In the embodiments described above, the Euclidean distance in the CIELAB color space is used as the color differences $\Delta E1$, $\Delta E2$, $\Delta \Sigma 1b$, and $\Delta E2b$. However, other values may be used instead. For example, it is possible to use the color difference $\Delta E_{00}$ found through the CIEDE2000 color-difference formula that is defined in JIS Z 8730 7.3. This allows one to calculate a color difference more appropriate for the characteristics of human sight. Alternatively, the Euclidean distance in another color space may be used as the color difference.

(6) In the first embodiment described above, the reference information RI is included in the color conversion profile PFD to associate backward-pass CMYK values with some of the representative combinations. These backward-pass CMYK values are selected from the forward-pass CMYK values recorded in the lookup table LT. However, other CMYK values unrelated to forward-pass CMYK values recorded in the lookup table LT may be associated with some of the representative combinations in the color conversion profile PFD.

(7) In the color conversion profiles PFD and PFD2 in the first and second embodiments described above, the backward-pass CMYK values correlated with the prescribed RGB values may be set differently according to the print mode and paper type. When printing, the degree to which the ejected ink runs on or spreads in the paper differs according to the type of paper (normal paper or glossy paper, for example). Consequently, the difference in color tone between forward images and backward images may also differ according to the type of paper. Accordingly, the reference information RI included in the color conversion profile PFD of the first embodiment may be replaced with normal-paper reference information RI1 and glossy-paper reference information RI2, for example. Further, in place of the first table PT1, the color conversion profile PFD2 in the second embodiment may include a normal-paper first table and a glossy-paper first table.

(8) In the embodiments described above, the CPU 410 of the personal computer 400 executes the print data generating process of FIG. 6, but a CPU of another device may execute this process. For example, the CPU 110 of the printer 100 may execute the print data generating process when the printer 100 receives print data to be printed from a user terminal. Further, a CPU in a digital camera that is connected to the printer either wirelessly or by a cable, for example, may execute the print data generating process on image data generated by the digital camera itself when capturing an image. Alternatively, a CPU of a server connected to the printer 100 or personal computer 400 via the Internet may execute the print data generating process on image data received from the printer 100 or personal computer 400. Further, a plurality of computers (for example, the CPU 410 of the personal computer 400 and the CPU 110 of the printer 100, or a plurality of CPUs in a plurality of servers) capable of communicating with each other over a network may each execute a portion of the print data generating process of FIG. 6.

(9) Part of the configuration implemented in hardware in the first and second embodiments described above may be replaced with software and, conversely, part of the configuration implemented in software may be replaced with hardware. For example, all or part of the print data generating process (FIG. 6) executed by the CPU 410 in the embodiments may be implemented by dedicated hardware configured of logic circuits.

While the description has been made in detail with reference to specific embodiments thereof, it would be apparent to those skilled in the art that various changes and modifications may be made therein without departing from the spirit and scope of the above described embodiments.

What is claimed is:

1. A print data generating apparatus comprising:
    a print executing unit including a print head, the print head having a plurality of nozzles for ejecting a plurality of colors of ink droplets respectively, the plurality of nozzles being arranged in a main scanning direction, the print executing unit being configured to perform bi-directional printing, the bi-directional printing including: forward print in which the print head forms dots by ejecting ink droplets while moving forward in the main scanning direction; and backward print in which the print head forms dots by ejecting ink droplets while moving backward in the main scanning direction;
    a storage unit storing a color conversion profile defining correlations between a plurality of sets of specific color data and a plurality of sets of ink color data, each set of specific color data having a combination of color component values that are defined in a specific color space, the plurality of sets of specific color data including at least one set of prescribed color data, each of the at least one set of prescribed color data having a prescribed combination of color component values that are defined in the specific color space, each set of ink color data having a combination of color component values that are defined in an ink color space, each of the color component values that are defined in the ink color space corresponding to one of the plurality of colors of ink droplets, the plurality of sets of ink color data including a plurality of sets of first ink color data and at least one set of second ink color data, each of the plurality of sets of the first ink color data having a first combination of color component values that are defined in the ink color space, each of the at least one set of the second ink color data having a second combination of color component values that are defined in the ink color space, each of the plurality of sets of specific color data being associated with a set of first ink color data, each of the at least one set of prescribed color data being associated with a set of first ink color data and a set of second ink color data; and
    a controller configured to:
        acquire target image data representing an image to be printed including a plurality of pixels each having a color, the target image data representing the color of each of the plurality of pixels by a combination of color component values defined in the specific color space;
        execute a color conversion on the target image data using the color conversion profile to generate converted image data, the converted image data including a plurality of converted pixels each having a color, the converted image data representing the color of each of the plurality of converted pixels by a combination of color component values defined in the ink color space, the controller executing the color conversion on the target image data by:
  acquiring partial image data from the target image data;
  executing, when the partial image data is first partial image data, a color conversion on the partial image data by using correlations between the plurality of sets of specific color data and the plurality of sets of first ink color data based on the color conversion profile, the first partial image data representing a first partial image, the first partial image being a portion of the image to be printed by performing one of the forward print and the backward print, the partial image data being either one of the first partial image data and second partial image data, the second partial image data representing a second partial image, the second partial image being a portion of the image to be printed by performing another of the forward print and the backward print; and
  executing, when the partial image data is the second partial image data, a color conversion on the second partial image data by:
    converting pixel data representing a pixel included in the second partial image by using a correlation between the at least one set of prescribed color data and the at least one set of second ink color data based on the color conversion profile, when the pixel data has a combination of color component values defined in the specific color space corresponding to the prescribed combination of color component values of the at least one set of prescribed color data; and
    converting pixel data representing a pixel included in the second partial image by using correlations between the plurality of sets of specific color data and the plurality of sets of first ink color data based on the color conversion profile, when the pixel data has a combination of color component values defined in the specific color space that does not correspond to the prescribed combination of color component values of the at least one set of prescribed color data; and
  generate print data based on the converted image data.

2. The print data generating apparatus according to claim 1, wherein a color difference between a forward image and a backward image is greater than a predetermined threshold, the forward image being printed by the forward print and based on a corresponding set of first ink color data associated with each of the at least one set of prescribed color data, the backward image being printed by the backward print and based on the corresponding set of first ink color data.

3. The print data generating apparatus according to claim 1, wherein each of the at least one set of second ink color data includes a combination of color component values identical to a combination of color component values of one of the plurality of sets of first ink color data.

4. The print data generating apparatus according to claim 3, wherein a color difference between a first image and a second image is smaller than or equal to a reference value, the first image being printed by the one of the forward print and the backward print and based on a set of second ink color data, the second image being printed by the another of the forward print and the backward print and based on corresponding one set of first ink color data associated with the at least one set of prescribed color data associated with the set of second ink color data.

5. The print data generating apparatus according to claim 4, wherein the combination of color component values of each of the at least one set of second ink color data is selected from at least one combination of color component values of the plurality of sets of first ink color data by:
  selecting candidate color data from the plurality of sets of first ink color data, the candidate color data meeting: that a difference in hue between the first image and the second image is smaller than a prescribed hue when a set of second ink color data used to print the first image and the second image is identical to the candidate color data; and that a difference in at least one of chroma and lightness between the first image and the second image is smaller than a prescribed value when a set of second ink color data used to print the first image and the second image is identical to the candidate color data; and
  determining, when a plurality of sets of candidate color data are selected, one of the plurality of sets of candidate color data having a smallest difference in hue among the plurality of sets of candidate color data as the second ink color data.

6. The print data generating apparatus according to claim 1, wherein the color conversion profile includes a table defining the correlations between the plurality of sets of specific color data and the plurality of sets of ink color data, each of the plurality of sets of specific color data being associated with one of the plurality of sets of ink color data, the at least one of set of prescribed color data being associated with one of the at least one set of second ink color data, the plurality of sets of specific color data being a part of combinations of color component values capable of being defined in the specific color space;
  wherein the controller executes the color conversion on the target image data using the table.

7. The print data generating apparatus according to claim 1, wherein the color conversion profile includes a first table and a second table, the first table defining a correlation between the at least one set of prescribed color data and another combination of color component values defined in the specific color space, the second table defining correlations between the plurality of sets of specific color data and the plurality of sets of first ink color data, each of the plurality of sets of specific color data being associated with a set of second ink color data on a basis of both of the first table and the second table;
  wherein the controller executes the color conversion on the first partial image data using the second table without using the first table;
  wherein the controller executes the color conversion on the second partial image data using both the first table and the second table.

8. The print data generating apparatus according to claim 1, wherein the print executing unit is configured to selectively operate in: a first mode in which the forward print is executed and the backward print is not executed; and a second mode in which the bi-directional printing is executed;
  wherein the color conversion profile includes: a main profile defining correlations between the plurality of sets of specific color data and the plurality of sets of first ink color data; and a sub profile defining correlations between the at least one set of prescribed color data and a plurality of sets of second ink color data;

wherein the controller executes the color conversion in the first mode using the main profile without using the sub profile;

wherein the controller executes the color conversion in the second mode using both the main profile and the sub profile.

9. A color conversion profile generating method for generating a color conversion profile that is used when a print executing apparatus generates print data, the print executing apparatus including a print head, the print head having a plurality of nozzles for ejecting a plurality of colors of ink droplets respectively, the plurality of nozzles being arranged in a main scanning direction, the print executing apparatus being configured to perform bi-directional printing, the bi-directional printing including: forward print in which the print head forms dots by ejecting ink droplets while moving forward in the main scanning direction; and backward print in which the print head forms dots by ejecting ink droplets while moving backward in the main scanning direction, the color conversion profile generating method comprising:

preparing a first profile for one of the forward print and the backward print, the first profile defining correlations between a plurality of sets of specific color data and a plurality of sets of first ink color data, each set of specific color data having a combination of color component values that are defined in a specific color space, the plurality of sets of specific color data including at least one set of prescribed color data, each of the at least one set of prescribed color data having a prescribed combination of color component values that are defined in the specific color space, each set of first ink color data having a combination of color component values that are defined in an ink color space, each of the color component values that are defined in the ink color space corresponding to one of the plurality of colors of ink droplets;

printing a plurality of first images based on the plurality of sets of first ink color data by executing one of the forward print and the backward print;

printing a plurality of second images based on the plurality of sets of first ink color data by executing another of the forward print and the backward print;

measuring a color of each of the plurality of first images and the plurality of second images, the plurality of first images and the plurality of second images being associated with one-to-one correspondence;

determining at least one set of prescribed color data from the plurality of sets of specific color data by:
calculating a first color difference between each of the plurality of first images and corresponding one of the plurality of second images; and
determining, as one set of prescribed color data, one of the plurality of sets of specific color data whose first color difference is greater than a predetermined threshold;

determining corresponding one set of second ink color data associated with each of the at least one set of prescribed color data, each set of second ink color data having a second color difference smaller than the first color difference, the second color difference being a difference between: an image based on the each set of second ink color data by executing the another of the forward print and the backward print; and another image based on one set of first ink color data associated with one set of prescribed color data associated with the each set of second ink color data by executing the one of the forward print and the backward print; and generating a color conversion profile including the first profile and a second profile, the second profile defining a correlation between each of the at least one set of prescribed color data and the corresponding one set of second ink color data.

10. A non-transitory computer readable storage medium storing a set of program instructions executable by a computer, the computer being configured to generate print data used in a print executing apparatus, the print executing apparatus including a print head, the print head having a plurality of nozzles for ejecting a plurality of colors of ink droplets respectively, the plurality of nozzles being arranged in a main scanning direction, the print executing apparatus being configured to perform bi-directional printing, the bi-directional printing including: forward print in which the print head forms dots by ejecting ink droplets while moving forward in the main scanning direction; and backward print in which the print head forms dots by ejecting ink droplets while moving backward in the main scanning direction, the computer including a storage unit storing a color conversion profile defining correlations between a plurality of sets of specific color data and a plurality of sets of ink color data, each set of specific color data having a combination of color component values that are defined in a specific color space, the plurality of sets of specific color data including at least one set of prescribed color data, each of the at least one set of prescribed color data having a prescribed combination of color component values that are defined in the specific color space, each set of ink color data having a combination of color component values that are defined in an ink color space, each of the color component values that are defined in the ink color space corresponding to one of the plurality of colors of ink droplets, the plurality of sets of ink color data including a plurality of sets of first ink color data and at least one set of second ink color data, each of the plurality of sets of the first ink color data having a first combination of color component values that are defined in the ink color space, each of the at least one set of the second ink color data having a second combination of color component values that are defined in the ink color space, each of the plurality of sets of specific color data being associated with a set of first ink color data, each of the at least one set of prescribed color data being associated with a set of first ink color data and a set of second ink color data, the program instructions comprising:

acquiring target image data representing an image to be printed including a plurality of pixels each having a color, the target image data representing the color of each of the plurality of pixels by a combination of color component values defined in the specific color space;

executing a color conversion on the target image data using the color conversion profile to generate converted image data, the converted image data including a plurality of converted pixels each having a color, the converted image data representing the color of each of the plurality of converted pixels by a combination of color component values defined in the ink color space, the color conversion on the target image data being executed by:
acquiring partial image data from the target image data;
executing, when the partial image data is first partial image data, a color conversion on the partial image data by using correlations between the plurality of sets of specific color data and the plurality of sets of first ink color data based on the color conversion profile, the first partial image data representing a first partial image, the first partial image being a portion of the image to be printed by performing one of the forward print and the backward print, the partial image data being either one of the first partial image data and second partial image data, the second partial image data representing a second partial image, the second partial image being a portion of the image to be printed by performing another of the forward print and the backward print; and executing, when the partial image data is the second partial image data, a color conversion on the partial image data by:

converting pixel data representing a pixel included in the second partial image by using a correlation between the at least one set of prescribed color data and the at least one set of second ink color data based on the color conversion profile, when the pixel data has a combination of color component values defined in the specific color space corresponding to the prescribed combination of color component values of the at least one set of prescribed color data; and converting pixel data representing a pixel included in the second partial image by using correlations between the plurality of sets of specific color data and the plurality of sets of first ink color data based on the color conversion profile, when the pixel data has a combination of color component values defined in the specific color space that does not correspond to the prescribed combination of color component values of the at least one set of prescribed color data; and generating the print data based on the converted image data.

11. The non-transitory computer readable storage medium according to claim 10, wherein a color difference between a forward image and a backward image is greater than a predetermined threshold, the forward image being printed by the forward print and based on a corresponding set of first ink color data associated with each of the at least one set of prescribed color data, the backward image being printed by the backward print and based on the corresponding set of first ink color data.

12. The non-transitory computer readable storage medium according to claim 10, wherein each of the at least one set of second ink color data includes a combination of color component values identical to a combination of color component values of one of the plurality of sets of first ink color data.

13. The non-transitory computer readable storage medium according to claim 12, wherein a color difference between a first image and a second image is smaller than or equal to a reference value, the first image being printed by the one of the forward print and the backward print and based on a set of second ink color data, the second image being printed by the another of the forward print and the backward print and based on corresponding one set of first ink color data associated with the at least one set of prescribed color data associated with the set of second ink color data.

14. The non-transitory computer readable storage medium according to claim 13, wherein the combination of color component values of each of the at least one set of second ink color data is selected from at least one combination of color component values of the plurality of sets of first ink color data by:

selecting candidate color data from the plurality of sets of first ink color data, the candidate color data meeting: that a difference in hue between the first image and the second image is smaller than a prescribed hue when a set of second ink color data used to print the first image and the second image is identical to the candidate color data; and that a difference in at least one of chroma and lightness between the first image and the second image is smaller than a prescribed value when a set of second ink color data used to print the first image and the second image is identical to the candidate color data; and determining, when a plurality of sets of candidate color data are selected, one of the plurality of sets of candidate color data having a smallest difference in hue among the plurality of sets of candidate color data as the second ink color data.

15. The non-transitory computer readable storage medium according to claim 10, wherein the color conversion profile includes a table defining the correlations between the plurality of sets of specific color data and the plurality of sets of ink color data, each of the plurality of sets of specific color data being associated with one of the plurality of sets of ink color data, the at least one of set of prescribed color data being associated with one of the at least one set of second ink color data, the plurality of sets of specific color data being a part of combinations of color component values capable of being defined in the specific color space;

wherein the color conversion is executed on the target image data using the table.

16. The non-transitory computer readable storage medium according to claim 10, wherein the color conversion profile includes a first table and a second table, the first table defining a correlation between the at least one set of prescribed color data and another combination of color component values defined in the specific color space, the second table defining correlations between the plurality of sets of specific color data and the plurality of sets of first ink color data, each of the plurality of sets of specific color data being associated with a set of second ink color data on a basis of both of the first table and the second table;

wherein the color conversion is executed on the first partial image data using the second table without using the first table;

wherein the color conversion is executed on the second partial image data using both the first table and the second table.

17. The non-transitory computer readable storage medium according to claim 10, wherein the print executing apparatus is configured to selectively operate in: a first mode in which the forward print is executed and the backward print is not executed; and a second mode in which the bi-directional printing is executed;

wherein the color conversion profile includes: a main profile defining correlations between the plurality of sets of specific color data and the plurality of sets of first ink color data; and a sub profile defining correlations between the at least one set of prescribed color data and a plurality of sets of second ink color data;

wherein the color conversion is executed using the main profile without using the sub profile in the first mode;

wherein the color conversion is executed using both the main profile and the sub profile in the second mode.

* * * * *